United States Patent
Klebensberger

(10) Patent No.: US 12,500,426 B2
(45) Date of Patent: Dec. 16, 2025

(54) METHOD FOR REGULATING AN INFEED POWER OF AN INFEED DEVICE INTO AT LEAST ONE PHASE OF AN ELECTRICAL CONSUMER NETWORK COMPRISING AT LEAST ONE ELECTRICAL CONSUMER

(71) Applicant: Wattando GmbH, Dresden (DE)

(72) Inventor: Boris Klebensberger, Dresden (DE)

(73) Assignee: WATTANDO GMBH, Dresden (DE)

( * ) Notice: Subject to any disclaimer, the term of this patent is extended or adjusted under 35 U.S.C. 154(b) by 0 days.

(21) Appl. No.: 18/694,240

(22) PCT Filed: Sep. 21, 2022

(86) PCT No.: PCT/EP2022/076269
§ 371 (c)(1),
(2) Date: Mar. 21, 2024

(87) PCT Pub. No.: WO2023/046778
PCT Pub. Date: Mar. 30, 2023

(65) Prior Publication Data
US 2024/0396345 A1     Nov. 28, 2024

(30) Foreign Application Priority Data
Sep. 22, 2021   (DE) ..................... 10 2021 004 783.4

(51) Int. Cl.
*H02J 3/48* (2006.01)
*H02J 3/38* (2006.01)

(52) U.S. Cl.
CPC ............ *H02J 3/48* (2013.01); *H02J 3/388* (2020.01); *H02J 2203/10* (2020.01)

(58) Field of Classification Search
CPC ........... H02J 3/48; H02J 3/388; H02J 2203/10
See application file for complete search history.

(56) References Cited

U.S. PATENT DOCUMENTS 7,977,818 B1   7/2011 Wahl
10,998,724 B1*  5/2021 Donahue ........... H02J 13/00006
(Continued)

FOREIGN PATENT DOCUMENTS

DE   102009031550 A1   1/2011
DE   102011115189 A1   3/2013
(Continued)

OTHER PUBLICATIONS

Search Report and Written Opinion of the International Searching Authority (ISA) for PCT Application PCT/EP2022/076269, provided by the European Patent Office on Jan. 23, 2023, with English translation.

(Continued)

*Primary Examiner* — Carlos Amaya
(74) *Attorney, Agent, or Firm* — Hodgson Russ LLP

(57) ABSTRACT

A method is provided for regulating the infeed power of an infeed device into at least one phase of an electrical consumer network comprising at least one electrical consumer. The method can include: detecting a first measured value representing power consumed or output by the consumer network at a given time; detecting a second measured value representing the infeed power supplied by the infeed device at the same time; determining a setpoint value based on the first and second measured values; regulating the infeed device according to the setpoint value to supply a corresponding infeed power; and feeding the infeed power into an electrical connection of the consumer network. The electrical connection can be located downstream of a metering unit, connected to at least one phase, and configured for AC voltages between 100 and 500 V.

19 Claims, 9 Drawing Sheets

(56) References Cited

U.S. PATENT DOCUMENTS

2017/0077711 A1  3/2017  Oesselke et al.
2020/0358311 A1  11/2020  Botarelli et al.

FOREIGN PATENT DOCUMENTS

| DE | 102013109608 A1 | 3/2015 |
| DE | 102013217743 A1 | 3/2015 |
| DE | 102014111094 A1 | 2/2016 |
| DE | 102017117830 A1 | 2/2019 |
| EP | 3462560 | 5/2021 |

OTHER PUBLICATIONS

Examination Report of the German Patent Office for German Patent Application 10 2021 004 783.4, dated Mar. 25, 2022.
"Premium Plug-in Installation (Smartmeter ADW400)," Sax Home Storage Installation Instructions, Oct. 2023, document No. IA-1-6-5-230, version 1.3.

* cited by examiner

METHOD FOR REGULATING AN INFEED POWER OF AN INFEED DEVICE INTO AT LEAST ONE PHASE OF AN ELECTRICAL CONSUMER NETWORK COMPRISING AT LEAST ONE ELECTRICAL CONSUMER

CROSS REFERENCE TO RELATED APPLICATION(S)

This application is a U.S. National Stage Entry of International Application No. PCT/EP2022/076269, filed Sep. 21, 2022, which claims priority to German Patent Application No. 10 2021 004 783.4, filed Sep. 22, 2021.

FIELD

The invention relates to a method for regulating an infeed power of an infeed device into at least one phase of an electrical consumer network comprising at least one electrical consumer. In addition, the invention relates to a control device.

BACKGROUND

Infeed devices, such as photovoltaic systems with controllable inverters, which feed electrical power into a house network, are known from the prior art. For example, a method for controlling a power supply in existing lines is known, in which the inverter receives a power setpoint value and an associated time period. The inverter continues to feed in until it receives a new specification within the allotted time period or it stops feeding in automatically. The disadvantage of this method is that the control software of the inverter must be adapted in such a way that the inverter switches off automatically after the time period has elapsed. However, this is often not available, such that the area of application of the method is limited. In addition, a disadvantage of the method is that malfunctions of the inverter and any associated infeeds are not measured or monitored directly, but are only recorded indirectly via a measuring device on the phase.

Known infeed devices are typically designed to provide an infeed current or an infeed power in accordance with a control signal, which is transmitted, for example, by an intelligent or digital electricity meter (English: smart meter), and to feed this directly into the house network. For the infeed, a separate line protected with overload protection must be laid, which electrically connects the inverter to a house fuse box. However, it is often time-consuming or impossible to lay a line. This is due to the fact that the owner's authorization is required to make these changes to the meter, house and protection device in order to lay the cable.

It is also necessary for the control system of the infeed power to meet safety criteria with regard to overload protection, which have different specifications in different countries. Since the infeed power provided by photovoltaic systems is generally not always completely consumed within the household network, situations can arise in which power is output to a supply network to which the house network is connected. It is often desirable to avoid such situations because feeding back into a public network is subject to legal regulations and/or involves additional regulatory effort and/or appears unattractive from an economic point of view or is not permitted. There is therefore a need for control systems, especially for photovoltaic systems, that prevent feeding back into the supply network and thus ensure zero infeed.

SUMMARY

It is the object of the present invention to provide a method for regulating the infeed power of an infeed device which does not have the disadvantages mentioned above.

This object is achieved by a method for regulating an infeed power of an infeed device into at least one phase of an electrical consumer network comprising at least one electrical consumer, comprising the following steps:
  a. Detection of a first measured characteristic value that characterizes a power consumed or output by the at least one phase of the electrical consumer network at a point in time,
  b. Detection of a second measured characteristic value that characterizes an infeed power fed into the at least one phase by the infeed device at the point in time, as the control value,
  c. Determination of a setpoint value from the first measured characteristic value and the control value,
  d. Regulation of the infeed device in accordance with the setpoint value so as to provide an infeed power corresponding to the setpoint value, and
  e. Feeding of the infeed power into an electrical connection of the consumer network, which electrical connection is in particular connected downstream of a metering unit of the consumer network (L), is electrically connected to at least one phase and is designed for AC voltages between 100 and 500 V.

A further object of the invention is to provide a control device which does not have the disadvantages mentioned above.

The object is achieved by a control device, in particular for carrying out a method according to one of the preceding claims, comprising
  at least one input interface for receiving a first measured characteristic value that characterizes a power consumed or output by the at least one phase of the electrical consumer network at a point in time, and for receiving a second measured characteristic value ($I_{MWR1-3}$) that characterizes an infeed power fed into the at least one phase by the infeed device at the point in time, as the control value,
  an evaluation unit for determining a setpoint value from the measured characteristic value and the control value,
  an output interface for outputting an output signal for regulating the infeed device in accordance with the setpoint value and
  an electrical control device connection for feeding the infeed power provided by the infeed device into the at least one phase, in particular into an electrical connection electrically connected to the phase, of the consumer network, wherein the control device connection is designed for AC voltages between 100 and 500 V.

Essentially, a regulation of the infeed power is proposed, in which the infeed power is detected, for example by measuring an infeed current fed in by the infeed device, in particular an inverter, and is used as a control variable or as a control value when determining the setpoint value. In this way, greater control over the control behavior of infeed devices, such as photovoltaic systems with inverters, can be ensured, since the infeed power provided by the photovoltaic system is measured.

The detection of the infeed power actually provided by the infeed device as a control value makes it possible in a particularly simple manner to flexibly parameterize the control and, in particular, to adapt it to the existing installation of the consumer network, in particular a building network. For example, the proposed regulation to ensure adequate overload protection can take into account the age of the collection lines and sub-lines laid in the consumer network, in particular the building network, and/or suitably specify the shut-off behavior of the infeed device at high loads.

A further advantage of the invention is that the method functions autonomously and independently of the infeed device used, in particular the inverter, in its control and safety functions. This means that a wide variety of system configurations can be implemented, with and without battery systems, emergency power supply, etc. Since the invention does not rely on adapting the inverter control/software, it can work with a very large number of standard inverters.

In addition, the inverter control software does not need modifying to carry out the method. In this respect, the control device can work together with a large number of standard inverters. In addition, by taking into account the output variable of the inverter, namely the infeed power or infeed current, a malfunction of the inverter can also be detected and dangerous situations can therefore be prevented.

The installation of the control device is minimally invasive in the consumer network and is reversible. In this respect, the installation does not require approval or is largely approval-free. In addition, the control device can be used to meet legal requirements, such as compliance with local legal standards and regulations, for example for overload protection and/or zero infeed. This is explained in more detail below.

A consumer network is understood to be a network that has at least one consumer that is supplied with electrical power from at least one phase. The consumer network can be a building network. A building network is understood to be a network that is electrically connected to a supply network, in particular a public grid. The building network can include a building electricity meter, which is connected downstream of a mains transfer point between the building network and the supply network and upstream of a building protection system. A building is a structure that encloses rooms and is used to accommodate people and/or animals and/or to store things. A building can be a house or an apartment building.

The consumer network can have an alternating voltage in the range between 100 and 500 V (volts). The consumer network can have a voltage of 100 to 120 V or 220 to 240V as well. This is the case if the consumer network is limited to single phase. The consumer network can have a voltage of 400V if it is multi-phase. The frequency in the consumer network can be between 45 and 67 Hz (Hertz), in particular between 50-60 Hz.

A further advantage of the invention is that the infeed power is fed into an electrical connection of the consumer network. The infeed power can be in a range between 800 Watt and 46 KW. The electrical connection can also be a socket. The socket can be a plug socket or a three-phase connection, which is often already present in buildings, for example. The electrical connection can also be a junction or distribution box, which are usually installed flush or surface-mounted.

In contrast to the prior art, it is not necessary for a separate circuit to be laid in the building, for example, which electrically connects the infeed device to the consumer network. In particular, it is not necessary for an electrical circuit to be laid that electrically connects the inverter to a building fuse. The control device can therefore be integrated into the consumer network non-invasively, reversibly and cost-effectively.

The electrical connection, in particular the socket, can be designed for a voltage range between 100 to 120 V or between 220 to 240 V. According to a publication by the US Department of Commerce, sockets of the type referred to here are known as:

Socket type A
Socket type B
Socket type C, EN 50075
Socket type D
Socket type E
Socket type E+F, CEE 7/7
Socket type E+F, CEE 7/17
Socket type F, CEE 7/4
Socket type F, GOST 7396
Socket type G, BS 1363
Socket type H
Socket type I
Socket type J, SN 441011
Socket type K
Socket type L
Socket type L
Socket type M The socket can correspond to one of the previously mentioned socket types. Alternatively or additionally, the socket can comply with the IEC 60906-1 standard or the NBR 14136 standard.

Alternatively, the socket can be designed for voltages greater than 240 volts and less than or equal to 500 V, in particular 400 V. These plugs are plugs according to the IEC 60309 standard or a plug according to at least one of the standards DIN 49445, DIN 49446, DIN 49447 and DIN 49448. Alternatively, the plug can comply with the Swiss standard SN441011. In the cases mentioned above, the socket corresponds to a three-phase connection.

The electrical connection is designed in such a way that the electrical connection to the infeed device can be detached again, in particular in a non-destructive manner. The electrical interconnection between the electrical connection, in particular the socket, and the control device connection can be a plug connection. The control device connection, in particular a plug-in connection, can be arranged at one end of an electrical circuit. The control device connection is used to transmit the infeed power provided by the infeed device into the electrical connection of the consumer network. The control device connection is designed and/or formed analogously to the electrical connection, such that it can be used in the above-mentioned voltage range, in particular in the above-mentioned voltage ranges.

As part of the method, several first measured characteristic values can be recorded. The first measured characteristic value can be any physical quantity which characterizes a power consumed or output by a phase of the electrical consumer network. If at least one first measured characteristic value is known, the power consumed by the supply network or output into the supply network can be determined. The first measured characteristic value can be a current that flows through the phase. The current can be determined using a current clamp or another suitable measuring unit. In addition, the first measured characteristic value can be a voltage of the phase. The power can be determined if the voltage and current are known. Alternatively, the voltage of the phase can be assumed, which eliminates the need to detect the voltage. The first measured characteristic value can include measured values that are determined by measuring devices already present in the consumer network, such as smart meters, and that characterize the power and/or current and/or voltage.

As part of the method, several second measured characteristic values can be recorded. The second measured characteristic value can be any physical quantity that characterizes the infeed power fed into the phase by the infeed device. This means that the infeed power can be determined if at least a second measured characteristic value is known. The second measured characteristic value can be a current, voltage, frequency, phase, or active, reactive or apparent power. If one or more of the previously mentioned values are known, the infeed power can be determined easily.

In one possible embodiment, the first measured characteristic value can characterize the power consumed or output by a single phase of the electrical consumer network. Alternatively, the consumed or output power can be determined for each phase. This enables a particularly precise determination of the infeed power fed into the respective phase. Alternatively, the first measured characteristic value can characterize the power consumed or output by several phases of the electrical consumer network.

The first measured characteristic value can correspond to a difference between the load of the at least one electrical consumer, which abuts the at least one phase, into which the infeed power is fed, and the infeed power fed into the at least one phase. This case occurs when the measuring device detects the first measured characteristic value on a phase. This also includes an embodiment in which the phase has several sub-lines and a load from at least one electrical consumer is applied on each sub-line.

In addition, the first measured characteristic value can be a difference between the load present on at least two phases and the infeed power fed into the at least two phases by the infeed device. Individual phase measurements can be carried out using the measuring device. In this case, the first measured characteristic value per phase is determined in the afore-mentioned manner. Alternatively or additionally, a balanced value across all phases or an average value of the phases can be determined. In addition, values that a utility or measuring device manufacturer consider to be correct can also be recorded. In addition, it is possible for the measuring device to have three current clamps or other suitable measuring units to measure the current in the individual phases. As a result, the measuring device delivers a first measured characteristic value that characterizes the power drawn or output per phase or for several phases, regardless of how this is defined in the country. The first measured characteristic value and the associated time interval serve as the basis for the control. The time interval can vary from milliseconds to minutes.

The first measured characteristic value can be recorded by a measuring device. In particular, the measuring device can be designed to detect measuring signals characterizing at least the first measured characteristic value and to transmit them to at least one input interface of the control device. The second measured characteristic value can be recorded by another measuring device. The other measuring device can be designed to detect measuring signals characterizing at least the second measured characteristic value and to transmit them to at least one input interface of the control device. Alternatively, the infeed device can transmit the second measured characteristic value to the control device. In such an embodiment, the infeed device has the other measuring device for detecting the second measured characteristic value. The data can be transmitted by log via at least one electrical line or wirelessly.

In a particular embodiment, the control device can in particular carry out an overload test. The overload test described below can be carried out on a control device in which only the first and second measured characteristic values are used to determine the setpoint value. During the overload test, the setpoint value from the first measured characteristic value and the control value, in particular in accordance with an overload criterion, can be determined in such a way that the setpoint value is set to zero, if a total power parameter derived from the first measured characteristic value and the control value reaches or exceeds an upper overload limit value.

The upper overload limit value can be easily determined by the user after the control device has been put into operation. The upper overload limit value can be specified on an overload protector. As described in more detail below, the upper overload limit value can be parameterized with additional factors and thus adapted to local or regional conditions or legal requirements. The overload protector is the one that is assigned to the phase into which the power is fed. In embodiments, in which the phase has at least one sub-line, the overload protector, which is assigned to the sub-line into which the infeed power is fed, is used. In embodiments, in which the phase has no sub-line, the overload protection of the phase into which the infeed power is fed is used.

As explained in more detail below, the setpoint value is limited upwards in the range that does not exceed the upper overload limit value. This ensures that the infeed power is kept as high as possible for as long as possible, especially as long as the phase is not overloaded. The upper overload limit value thus defines an upper load limit at which, for example for reasons of overload protection, no more infeed current may or should flow into the consumer network.

For example, the setpoint value is determined in accordance with the overload criterion in such a way that a characteristic curve describing the setpoint value as a function of the total power parameter in a trigger interval, which is limited downwards by a lower overload limit value and upwards by the upper overload limit value, decreases in particular monotonically, in particular linearly, to zero. In the trigger interval, the infeed device is regulated to zero, in particular linearly, as the load increases. The lower overload limit value marks the point from which the infeed power is reduced.

The width of the trigger interval can be specified or limited depending on a trigger factor defining a switching characteristic. The trigger factor can, for example, be selected so that the shut-off behavior of the control device essentially corresponds to a trigger characteristic that is modeled on a fuse. In the trigger interval, however, power can be consumed, for example, by the at least one phase of the electrical consumer network into which infeed power can be fed. In this case, power from the supply network, in particular the low-voltage network, which is electrically connected to the electrical consumer network can be consumed by the phase. This means that, in the trigger interval, the total power parameter has a proportion that results from the infeed power fed into the phase and another proportion that results from the power consumed by the supply network.

The characteristic curve describing the setpoint value as a function of the total power parameter has an at least partially linear curve, for example, in another operating interval, which is limited at the top by the lower overload limit value. The other operating interval can therefore include a range in which there is no load request from the electrical consumer or consumers and is limited at the top by the lower overload limit value. In this case, the electricity is fed into the supply network, in particular the public grid. Optionally, the setpoint value in the other operating interval can correspond to the total power parameter or be smaller than the total power parameter. As a result, the total power parameter value in a load range below the lower overload value can only consist of the infeed power fed in and in a range above the upper overload limit value only of the power consumed by the supply network.

The total power parameter value can correspond to a sum of the control value and the first measured characteristic value. This means that in cases where the setpoint value corresponds to the total power parameter value, no power can be fed into the consumer network by the supply network. On the other hand, in cases where the setpoint value is smaller than the total power parameter value, power can be fed into the consumer network through the supply network in addition to the infeed power through the infeed device. Alternatively, power can only be fed in via the supply network. The control system can be designed in such a way that the total power parameter value corresponds to the load value of all electrical consumers (i.e. the sum of the loads of the electrical consumers) that apply a load to the phase into which the power is fed or, if permissible, the total power parameter value can correspond to the load value of all electrical consumers on all phases.

In the case of a permitted grid infeed, i.e. an infeed into the supply network, in particular the public grid, the setpoint value can be greater than the total power parameter value. In this case, the setpoint value can correspond to the maximum possible setpoint value of the infeed device. However, the level of the setpoint value is limited by the overload criterion of the infeed line. In other words, the setpoint value is limited by the lower overload limit value.

The upper and/or the lower overload limit value can be specified depending on at least one installation-related safety parameter and/or depending on the trigger factor defining the switching characteristic. The installation-related safety parameter can depend on the overload protector, such as a fuse, which is assigned to a phase into which power is fed. The safety parameter can depend on a nominal current of the overload protector. Alternatively or additionally, the installation-related safety parameter can depend on a current carrying capacity and/or dimensioning of the phase. The dependence of the safety parameter on the upper and/or lower overload limit value offers the advantage that the control device can be easily set up by an electrician. This is possible because the nominal current of the overload protector, especially the fuse, is usually specified. Thus, the electrician does not need to carry out measurements on the phase to determine the safety parameter.

The overload protector, in particular the nominal current of the overload protector, which is assigned to the phase into which the power is fed, can be used. If the phase has a collection line and sub-lines, the overload protector that is assigned to the sub-line into which the power is fed can be used. In an embodiment, in which only one measuring device is provided in the phase, the overload protector assigned to the sub-line of the phase into which the power is fed will be used.

In consumer networks with sub-distribution of phases, installation-related safety parameters of overload protectors, in particular the nominal current of the respective overload protector, can be determined, which in particular can also be assigned to sub-lines. In this way, at least one installation-related safety parameter can be determined, which depends on the overload protector that is assigned to the sub-line of the phase into which the feed is fed.

In a particular embodiment, the control device can in particular carry out a zero infeed test. During the zero infeed test, the setpoint value can be determined, in particular in accordance with a zero infeed criterion, in particular in such a way that the setpoint value is less than or equal to at least one load of the electrical consumer that is present to the at least one phase. If the phase has sub-lines, the load is made up of the load of the loads of the electrical consumers present on the sub-lines.

Alternatively, the setpoint value can be less than or equal to a load of the electrical consumers, wherein the load corresponds to a, in particular balanced, average value of the load present on the individual phases, in particular including the sub-lines present on the phases. In the event that infeed into the supply network or public grid is permitted, the setpoint value is selected such that it is less than or equal to a predetermined upper limit that may be fed into the supply network.

If the infeed power is always less than or equal to the load of the at least one phase into which the infeed power is fed, or the load of the phases into which the infeed power is fed, then there is zero infeed. With zero infeed, no power is output, in particular no current flows, from the consumer network into the external supply network, in particular the low-voltage network, which is electrically connected to it. The setpoint value can also be determined, in particular in accordance with the zero infeed criterion, in such a way that the setpoint value does not at least exceed the load that is present on the at least one phase into which the power is fed. In this case, the load on the at least one phase of the consumer network is also always greater than the infeed power provided by the infeed device, so that the setpoint value specification of the proposed control corresponds to zero infeed.

National particulars can be taken into account as part of the zero infeed test. The existence of zero infeed can be assessed differently in different countries. Parameters that are set by a grid supplier and/or standards can also be taken into account as part of the zero infeed test.

During the zero infeed test, the first measured characteristic value can be used to test whether, at point in time t, power is being output from the phase to which the infeed device is present to the network electrically connected to the electrical consumer network, in particular to the external supply network already mentioned above. Based on the first measured characteristic value, it can be determined whether the phase of the consumer network into which power is or is to be fed is consumed or output at point in time t with respect to the external supply network. Alternatively or additionally, the first measured characteristic value can be used to determine at any time or in accordance with the measured variable, and/or time and/or duration of the regional or national suppliers or laws, whether power is consumed by the external network or power is output to the external network.

There can be infeed into the consumer network when there is zero infeed, i.e. when the consumer network draws power from the external supply network. In other words, the infeed power provided in accordance with the setpoint value is fed into the at least one phase of the consumer network, when it is determined that power is consumed from the consumer network, in particular at point in time t, from the external supply network, such as the low-voltage network. It goes without saying that, in particular, zero infeed is optional or does not necessarily have to be implemented, especially if feeding back into the external supply network to which the consumer network is connected is easily possible or even desired.

In a particular embodiment, the control device can have at least one further measuring device for measuring a third measured characteristic value. In particular, the further measuring device can be designed to detect measuring signals characterizing at least the third measured characteristic value and to transmit them to at least one input interface. The control device can therefore detect a third characteristic value in addition to the first measured characteristic value and the second measured characteristic value. Providing a further measuring device and detecting a third measured characteristic value offers the advantage that an infeed power can be fed into the phase in a larger operating range than in the embodiment described above, in which the control device only detects the first and second measured characteristic values.

The third measured characteristic value can be determined, which depends on an infeed power fed into a sub-line of a phase of the consumer network and the load of at least one electrical consumer present on the sub-line of the phase into which the infeed power is fed. In particular, the third measured characteristic value can correspond to a difference between the load of at least one electrical consumer present on the sub-line of the phase into which the infeed power is fed and the infeed power fed into the sub-line of the phase. The further measuring device can be arranged in a sub-line of a phase into which infeed power is fed. In this case, the further measuring device can be arranged in a collection line of a phase into which power is fed.

The control device can carry out at least one further overload test, in particular in addition to the overload test and/or zero infeed test described above. During the further overload test, the setpoint value from a third measured characteristic value and the control value, can be determined in such a way that the setpoint value is set to zero, if a total power parameter derived from the third measured characteristic value and the control value reaches or exceeds the upper overload limit value. The upper overload limit value may depend on an overload protector associated with a collection line of the phase into which power is fed.

As part of the method, several third measured characteristic values can be recorded by the further measuring device. The third measured characteristic value can be any physical quantity that characterizes the power consumed or output into the sub-line in which the further measuring device is arranged. With knowledge of at least a third measured characteristic value, the power that is consumed by the sub-line or output from the sub-line can be determined. The third measured characteristic value can be a current value of a current that flows through the sub-line. Alternatively, the third measured characteristic value can be a voltage or power. The current can be determined using a current clamp or another measuring unit. In addition, the third measured characteristic value can be a voltage of the sub-line. The power can be determined if the voltage and current are known. Alternatively, the voltage of the sub-line can be assumed, which eliminates the need to detect the voltage.

The setpoint value is determined in such a way that a characteristic curve describing the setpoint value as a function of the total power parameter in a trigger interval, which is limited downwards by a further lower overload limit value and upwards by the upper overload limit value, decreases in particular monotonically, in particular linearly, to zero. The setpoint value is set to zero if the total power parameter is greater than the upper overload limit value.

During the further overload test, the width of the trigger interval is also specified depending on a trigger factor defining a switching characteristic. The upper and/or the other lower overload limit value are specified or limited depending on at least one installation-related safety parameter and/or depending on the trigger factor defining the switching characteristic. Reference is made to the explanations above in respect of the trigger factor and the installation-related safety parameter. The safety parameter of the other lower overload limit value also depends on the nominal current of the overload protector, in particular the fuse. The overload protector of the collection line is assigned to the phase into which the infeed power is fed.

In the further overload test, the setpoint value can be constant in an interval that is limited downwards by the lower overload limit value and upwards by the other lower overload limit value. The other lower overload limit value depends on the overload protector that is assigned to the collection line of the phase into which infeed power is fed, and the lower overload limit value depends on the overload protector that is assigned to the sub-line of the phase into which infeed power is fed. In addition, the characteristic curve describing the setpoint value as a function of the total power parameter can have an increasing curve, in particular an at least partially linear curve, in another operating interval which is limited at the top by the lower overload limit value.

The setpoint value corresponds to a load value of the at least one electrical consumer or is smaller than a load value of the electrical consumer, with the at least one electrical consumer applying load to the phase into which the infeed power is fed. This applies to versions in which no infeed power can be fed into the supply network or public grid. The control system is designed in such a way that the total power parameter corresponds to the load value of the at least one electrical consumer, which is the electrical consumer that applies a load to the phase into which the infeed power is fed.

In an embodiment, in which it is possible to feed into the supply network or public grid, the setpoint value can correspond to the maximum possible setpoint value of the infeed device. However, the level of the setpoint value is limited by the overload criterion of the infeed line or, in the case of a phase with sub-distribution and two measuring devices, the smallest of the two overload criteria. In other words, the setpoint value is limited by the lower overload limit value.

In a particular embodiment, the setpoint value can be determined as part of a criterion test. In particular, the setpoint value can also take into account at least one additional predeterminable criterion, in particular several criteria. In this way, local conditions can be taken into account as a criterion or criteria when determining the setpoint value. In particular, laws, standards or other safety features, in particular local safety requirements, can be taken into account as criteria when determining the setpoint value. Criteria such as country-specific criteria, cost criteria, etc. can be taken into account as part of the criterion test. This offers the advantage that the method can be used in different regions with different requirements, in particular different legal requirements.

The determination of the setpoint value in the context of the aforementioned tests can preferably be carried out in parallel or time-synchronously, for example by means of the control device or another suitable, in particular electronic, evaluation unit. The tests may include the criterion test, the at least one overload test and/or the zero infeed test and/or the further overload test. The evaluation unit can have a processor. As part of the regulation, it is conceivable that in addition to the above-mentioned tests, further tests are carried out in parallel or synchronously, in which the setpoint value is determined. In a time-synchronous test, the tests are carried out one after the other, but refer to the same point in time.

In embodiments, the setpoint value determined during the tests, which has the smaller numerical value, is used for regulating the infeed device. Various conditions or criteria can be modeled within the framework of the presented regulation in such a way that numerical values are assigned to the setpoint values during the tests, regardless of whether the conditions are met for the present load case or not. The setpoint value that is actually transmitted to the infeed device to regulate it corresponds to the smallest of the numerical values. In this way, the setpoint value is always selected for which all conditions, in particular zero infeed and/or overload criteria and/or predeterminable criteria, are met. In addition, a safety function is easily implemented to prevent the power fed into the network from being too high.

The control device is designed to carry out the above method. In addition, the control device can communicate with the measuring device, the other measuring device and/or the further measuring device. In particular, the measured characteristic values recorded by the measuring devices can be transmitted to the control device.

The data transmission or data communication, in particular between the input interface and the measuring device and/or between the input interface and the other measuring device and/or between the input interface and the further measuring device, preferably takes place via a fail-safe data exchange protocol. For this purpose, for example, when transmitting data, in particular between the measuring devices and the control device, time stamps or the like can be used, which can be used by the evaluation device to test whether the corresponding measuring device regularly sends data and thus functions properly. In addition, by using the time stamps or the like, the control can be designed to be time-synchronous and transmission errors between the measuring devices and the control device can be avoided. If an incorrect behavior is detected, an emergency shutdown of the infeed device or disconnection of the feed can take place, for example for safety reasons. Alternatively, the setpoint value can be reduced or set to zero. The emergency shutdown can be done independently or manually by a user of the control device. Alternatively or additionally, the emergency shutdown can be carried out by the supplier. An autonomous safety circuit can be present which monitors the error-free communication between the measuring devices, the infeed device and the control device as well as the data consistency of the measured characteristic values and setpoint values.

The communication between the infeed device and the control device can take place via a bidirectional data interface. Communication can take place via the data interfaces via RS485 and a Modbus data protocol, here preferably the Sunspec Modbus data protocol. The control device uses this interface to transmit the setpoint values and can alternatively receive the third measured characteristic value or other data from the infeed device that is required for regulating the infeed device. The communication between the individual components of the control device can take place wirelessly, in particular via WLAN, and/or cable and/or Bluetooth.

The control device connection can be a plug-in connection. The plug-in connection can be connected to the electrical connection of the consumer network described above. In particular, the plug-in connection can be connected to the socket, in particular the plug socket, of the electrical consumer network. This means that the power provided by the infeed device is fed into the socket of the electrical consumer network. The safety criteria to be met for direct feeding into the consumer network can be easily implemented using the control system described above and, in particular, adapted to installation-related conditions.

An isolation test can be carried out in further training. If the isolation test determines that an isolation criterion exists, the infeed device is disconnected from the consumer network. The isolation can take place electronically, in particular based on a result determined by the evaluation device. In this case, the control device, in particular an autonomous safety circuit, prevents the infeed power from being fed into the consumer network. The isolation criteria can be specified by a standard.

The isolation can occur if the second measured characteristic value has an unexpected value, such that there is a defective infeed device. Alternatively or additionally, the control device can prevent infeed power from being fed in if further criteria are met, which can be used to conclude that there is a defect and/or feeding in infeed power is not desired. In addition, the isolation can occur if, after a predetermined period of time, no more measured characteristic values are recorded and/or no more setpoint values are generated.

Isolation can be done mechanically. For this purpose, an isolating device, in particular a switch or button, can be present. The isolation test by the isolating device can be carried out independently of the processing by the control device. This means that the isolating device is autonomous from the control device. The infeed device can therefore be isolated from the consumer network by means of the isolating device, even if the evaluation device does not consider isolation necessary.

BRIEF DESCRIPTION OF DRAWINGS

The invention is explained in more detail below using exemplary embodiments that are illustrated in the figures, with identical parts or, in particular, corresponding parts in terms of their function being provided with the same reference numerals in all figures. Schematically.

DETAILED DESCRIPTION

Figure 1:
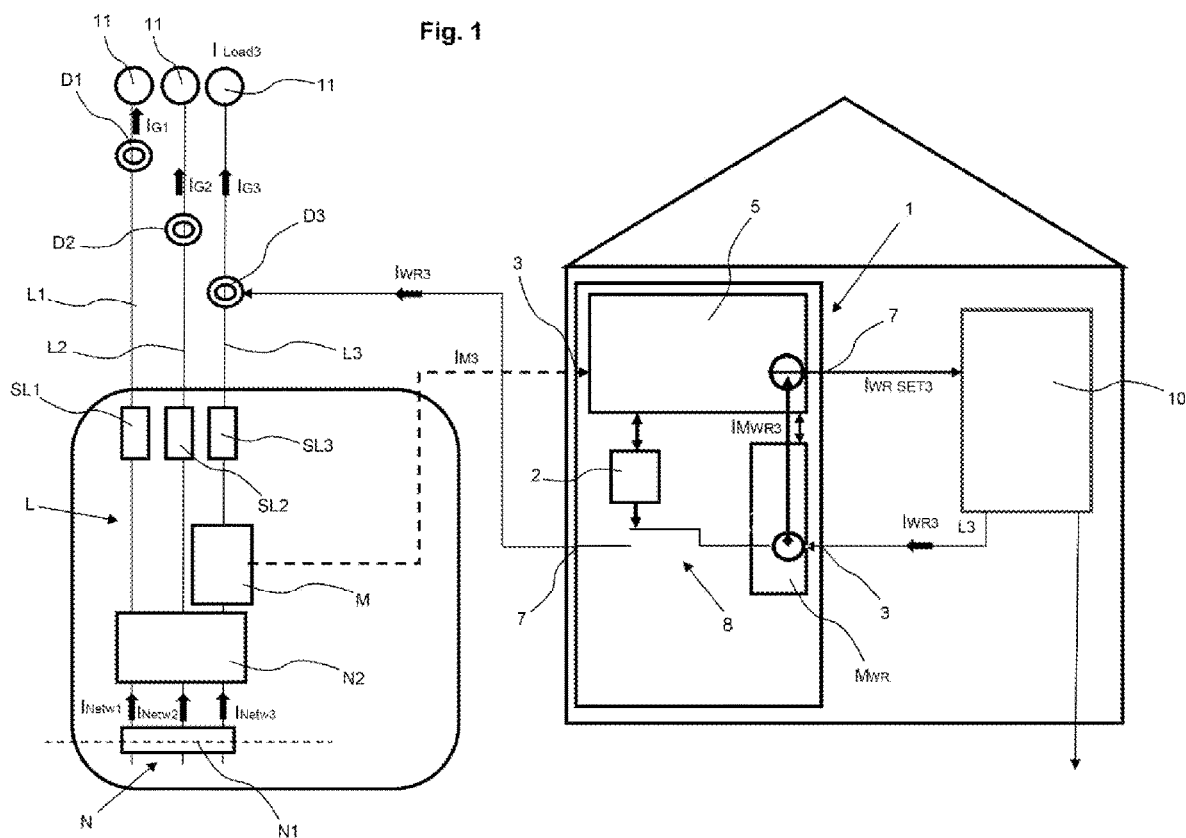
FIG. 1 shows a schematic circuit diagram of a building network with a single-phase infeeding infeed device and a control device controlling the infeed device according to a first exemplary embodiment.

FIG. 1 shows a circuit diagram of a three-phase consumer network, which is designed as a building network L. The building network L has an infeed device 10, which feeds electrical power into at least one phase L1, L2, L3 of the building network. In the case shown in FIG. 1, an infeed current $I_{WR3}$ is fed into an electrical connection D3 of phase 3. The electrical connection D3 can be a plug socket that is electrically connected to the building network L. Each of the phases L1-L3 has at least one such electrical connection D1, D2, D3. The electrical connection D1-D3 is respectively designed for voltages in the range between 100 and 500 volts. The infeed device 10 is designed, for example, as a photovoltaic system with a controllable inverter and optionally an energy storage device, in particular a battery. Only the inverter of the infeed device 10 is shown in FIG. 1.

The electrical power to be provided or fed in by the infeed device 10, which is referred to below as infeed power, can occur in accordance with a setpoint value specification, which characterizes the characteristic curve $I_{WR\ Set1-3}$ of FIG. 5. A setpoint value I to be set by the infeed device $10_{WR\ Set3}$ for the infeed power is determined by means of a control device 1. The control device 1 determines the setpoint value $I_{WR\ Set3}$ depending on measured characteristic values that characterize the infeed power fed in by the infeed device 10 at point in time t and the power drawn, i.e. consumed or output, from an external, in particular public, supply network N at point in time t.

In general, power can be output from the building network L to the external supply network N or power can be consumed by the external supply network N. In embodiments, it is particularly provided that the setpoint value $I_{WR\ Set}$ is specified in such a way that the infeed power provided by the infeed device 10 into the phase L1, L2, L3 is always less than or equal to the load $I_{Load1-3}$ present on the respective phase L1, L2, L3. The load is applied by electrical consumers 11. As part of the method for regulating an infeed power of the infeed device 10, the load of at least one electrical consumer present on a phase can be used as the load, as is the case in the embodiment shown in FIG. 1.

Typically, both the building network L and the external supply network N are low-voltage networks with a mains voltage of around 100V to 500V. The building network L can, for example, also include several buildings, in particular an industrial facility or a residential area.

The control device 1 has a measuring device M for detecting a first measured characteristic value $I_{M3}$. The measuring device M is connected downstream of a metering unit, in particular a building electricity meter N2, and a mains transfer point N1, which provides the connection to the external supply network N. The measuring device M can be used to detect a current intensity of the current flowing in phase L3, in particular in an overload protector SL3 assigned to phase L3. This current intensity measurement determines a first measured characteristic value $I_{M3}$, which characterizes the net load present on phase L3, i.e. the load $I_{Load3}$ present on phase L3 minus the infeed current provided by the infeed device 10. The measuring device M is not limited to measuring the current intensity, but can also be used to measure a measured variable that characterizes the power and/or the power flow. In an alternative embodiment, not shown, the measuring device M can determine a first measured characteristic value that characterizes the net load across all three phases. The determination of such a first measured characteristic value can be carried out analogously to the determination of the first measured characteristic value in the embodiment shown in FIG. 2 described below.

The control device 1 can also have a second measuring device $M_{WR}$ for detecting a second measured characteristic value $I_{MWR3}$. In particular, the second measuring device $M_{WR}$ can be used to measure the current intensity of the infeed current $I_{WR3}$ provided by the infeed device 10. Alternatively, in an embodiment not shown, the control device 1 receives the current intensity of the infeed current $I_{WR3}$ from the control device 1. This is possible because the control device 1 can communicate with the infeed device 10 using data technology. The second measured characteristic value $I_{MWR3}$ characterizes the infeed power fed into the building network L by the infeed device 10.

The infeed power provided by the infeed device 10 at point in time t is detected, as described above, by measuring at least a second measured characteristic value $I_{MWR3}$, such as the infeed current that flows from the infeed device 10 to the infeed node of the building network L at point in time t. This measurement of the second measured characteristic value determines a control value that is to be set based on the setpoint value $I_{WR\ Set3}$. In other words, in the present embodiment, the control value corresponds to the infeed current provided by the infeed device 10 and, as part of a control process, the control unit 1 ensures that the infeed power provided by the infeed device 10 corresponds to or does not exceed the setpoint value $I_{WR\ Set3}$.

The control device 1 has an evaluation unit 5. The setpoint value $I_{WR\ Set3}$ is determined by means of the evaluation unit 5, in particular a controller or microcontroller, based on the first measured characteristic value $I_{M3}$ and the second measured characteristic value $I_{MWR3}$, in particular the control value. In addition, parameterization inputs, such as the nominal current of at least one overload protector, etc., are determined during commissioning. In the embodiment shown in FIG. 1, the power is fed into phase L3, such that only a single setpoint value $I_{WR\ Set3}$ is determined. The control device 1 is designed to control the infeed device 10 in accordance with the setpoint value $I_{WR\ Set3}$ so as to provide a corresponding infeed power and to feed the provided power into the building network L, in particular into phase L3. To control the infeed device 10, an output interface 7 is provided, which communicates with the infeed device 10, for example, via common data exchange protocols. The control device 1 or the evaluation unit 5 has at least one input interface 3 for detecting or receiving measurement signals, in particular from the measuring devices M, $M_{WR}$. The measuring device M transmits the recorded data via radio to the evaluation unit 5. Alternatively, in an embodiment not shown, a connection via an electrical line is also possible. The other measuring device $M_{WR}$ transmits the recorded second measured characteristic values $I_{MWR3}$ to the evaluation unit 5.

The power is preferably fed in by means of a control device connection, in particular a plug-in connection, of the control device 1, which is designed for connection to the electrical connection D1, D2, D3 of the building network L. In order to feed into several phases L1, L2, L3, several control device connections are provided in embodiments (see in particular FIGS. 2 to 4). The electrical connections D1, D2, D3 are arranged downstream of the building electricity meter N2.

FIG. 1 shows a three-phase building network L without sub-distribution, in which the feed takes place at the electrical connection D3 of phase L3. Downstream of the electrical connection D3, a total power is available that is made up of the infeed power fed into phase L3 by the infeed device 10 and the power consumed by phase L3 from the external supply network N. The control unit is designed in such a way that a total power parameter IG1-3 corresponds to the load $I_{Load1-3}$ present on the consumer. In the other phases that have the sockets D1, D2, the total power is made up of a maximum of the power drawn from the external supply network N in the respective phases L1, L2, because infeed power provided by the infeed device 10 is not fed into these phases L1, L2. The phases L1, L2, L3 are each assigned a fuse or overload protector SL1, SL2, SL3. The electrical connections D1, D2, D3 are arranged downstream of the overload protectors SL1, SL2, SL3.

The other measuring device $M_{WR}$ and the evaluation unit 5 communicate with each other. The second measured characteristic value $I_{MWR3}$ recorded by the other measuring device $M_{WR}$, in particular the infeed current intensity, is transmitted to the evaluation unit 5. The other measuring device $M_{WR}$ is electrically connected to the electrical connection D3. In particular, the infeed current output by the infeed device 10 is output to the electrical connection D3 via an output interface 7 of the control device 1. The evaluation unit 5 analyzes the data recorded by the other measuring device $M_{WR}$ and the output interface 7 issues a control command to the infeed device 10 so that the infeed power output by the infeed device 10 corresponds to the setpoint value.

In addition, after analyzing the received data, the evaluation unit 5 can inform the other measuring device $M_{WR}$ that a fault has occurred, such that no infeed power is output to the building network L. In this respect, the control device 1 can disconnect the electrical connection between the infeed device 10 and the building network L.

For this purpose, the control device 1 has an isolating device 8. The isolating device 8 has a switch by means of which an electrical connection between the infeed device 10 and the building network L can be isolated, in particular disconnected. The isolating device 8 can isolate the electrical connection independently of the processing of the data in the evaluation device 5. For this purpose, the isolating device has a safety device 2. The safety device 2 is configured in such a way that it can isolate the electrical connection even if no error is detected by the evaluation device 5. The isolating device 8 thus represents a redundant isolation option for the isolation by the evaluation device 5 described above. In other words, the control device 1 is doubly fail-safe. The isolating device 8 can be designed in such a way that the electrical connection between the infeed device 10 and the building network L can be isolated galvanically and mechanically.

Figure 2:
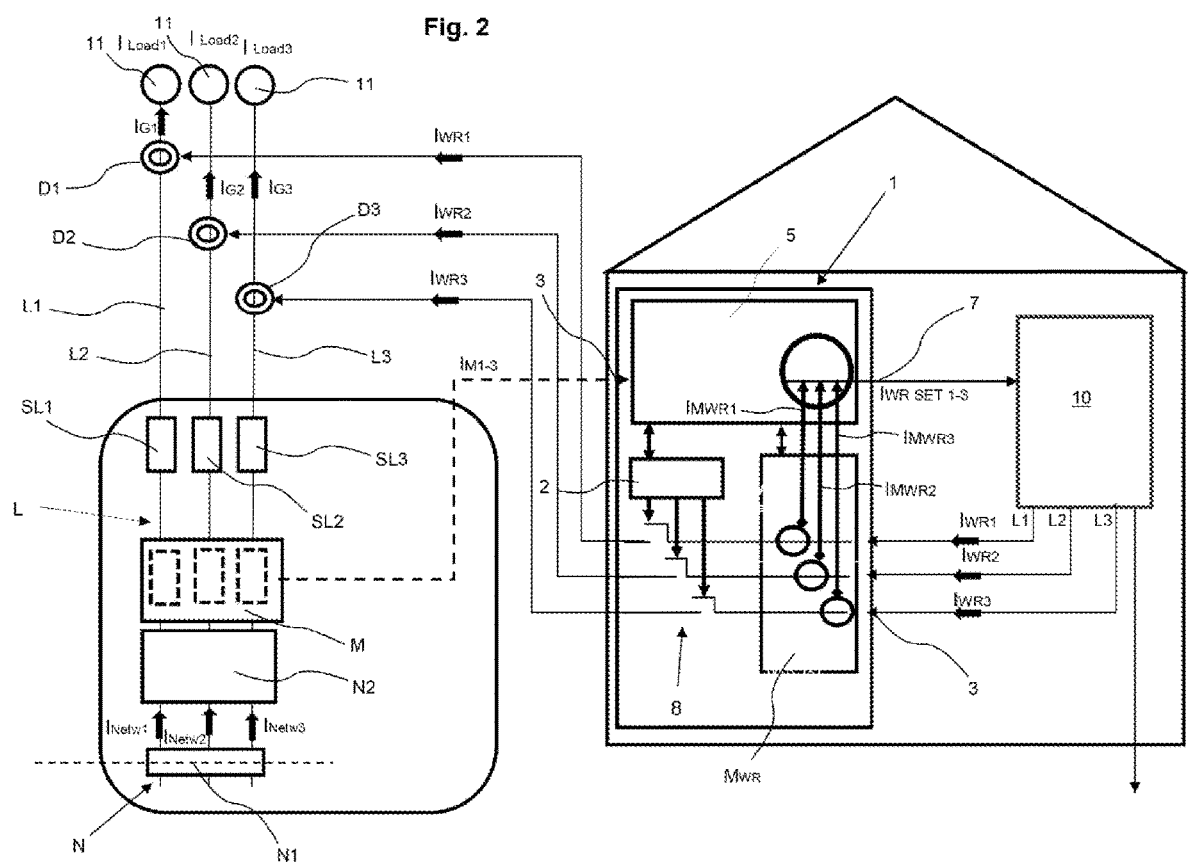
FIG. 2 shows a schematic circuit diagram of a three-phase building network with a three-phase infeeding infeed device and a control device controlling the infeed device according to a second exemplary embodiment.

FIG. 2 shows a three-phase building network L without sub-distribution and a three-phase infeed device 10. The control unit 1 feeds the infeed power provided by the infeed device 10, in particular the infeed current, into the electrical connection D1 of phase L1, into the electrical connection D2 of phase L2 and into the electrical connection D3 of phase L3 in accordance with the setpoint value specification. The control device 1, in particular the other measuring device $M_{WR}$, receives an infeed power per phase provided by the infeed device 10, which is characterized by the second measured characteristic value $I_{MWR1-3}$. In the embodiment shown in FIG. 2, it is assumed that there is no fault, such that the infeed power is fed into the individual phases L1, L2, L3.

The setpoint value $I_{WR\ Set1-3}$ is determined for each infeeding phase L1, L2, L3. The second measured characteristic value $I_{MWR1-3}$ is determined for each infeeding phase L1, L2, L3. The determination of the first measured characteristic value $I_{M1-3}$ takes place in the measuring device M and the determination of the second measured characteristic value I $I_{MWR1-3}$ takes place in another measuring device $M_{WR}$. The determination of the first and second measured characteristic value $I_{M1-3}$, $I_{MWR1-3}$, as already described above, can be carried out using measuring devices specifically intended for this purpose; in embodiments, typically existing measuring devices such as electricity meters and in particular digital electricity meters can also be used for this purpose. The infeed power provided by the infeed device 10 can alternatively be transmitted via protocol. In this embodiment, no other measuring device $M_{WR}$ is required.

The measuring device M measures at least a first measured characteristic value $I_{M1-3}$ relating to phases L1, L2, L3. In one embodiment, the measuring device M can be designed such that individual phase measurements are carried out. In this case, three phase measurements are available as the first measured characteristic values $I_{M1}$, $I_{M2}$, $I_{M3}$. The first measured characteristic values serve as input variables for the control system described above. The first measured characteristic value depends on a difference between a load present on the phases L1, L2, L3 and the infeed power fed into the respective phases L1, L2, L3 by the infeed device 10. The first measured characteristic value can be a current intensity, analogue to the embodiment shown in FIG. 1. The measuring device M can have three current clamps in order to measure the current in the individual phases. In particular, each phase L1, L2, L3 can be assigned a current clamp. The current clamps are symbolized in FIG. 2 by the dashed lines in the measuring device M.

The evaluation device 5 receives the first measured characteristic values $I_{M1-3}$ and determines the setpoint values $I_{WR\ Set1-3}$ for the three phases L1-L3. These setpoint values are transmitted to the infeed device 10, which determines an infeed power, in particular infeed current, assigned to each phase L1-L3, which is measured in the other measuring device $M_{WR}$ as the second measured characteristic value $I_{MWR1-3}$.

In another embodiment, not shown, the first measured characteristic value can be determined in a different way. In particular, in this embodiment, the first measured characteristic value is not determined for each phase L1, L2, L3, but rather a first measured characteristic value is output that characterizes all three phases L1, L2, L3. In particular, a balanced value across all three phases, or an average value of the phases, can be determined and output as the first measured characteristic value. Alternatively or additionally, a value that a utility or measuring device manufacturer considers to be correct can be recorded as the first measured characteristic value. The output measured characteristic value is then used to determine the setpoint values $I_{WR\ Set1-3}$ for the three phases L1, L2, L3.

In this embodiment, it may be the case that in the phase into which infeed power is fed, power is fed into the supply network because power is drawn from the supply network N at another phase. The sum of the power fed into or drawn from the supply network is zero or within a permitted range. This embodiment can therefore be used in countries where netting of grid consumption is permitted or used.

In both embodiments described above, the measuring device M delivers at least a first measured characteristic value that characterizes the power drawn or output, regardless of how this is defined in the country. The first measured characteristic value and the associated time interval serve as the basis for the regulation in the control device 1. The time interval can vary from milliseconds to minutes.

Figure 3:
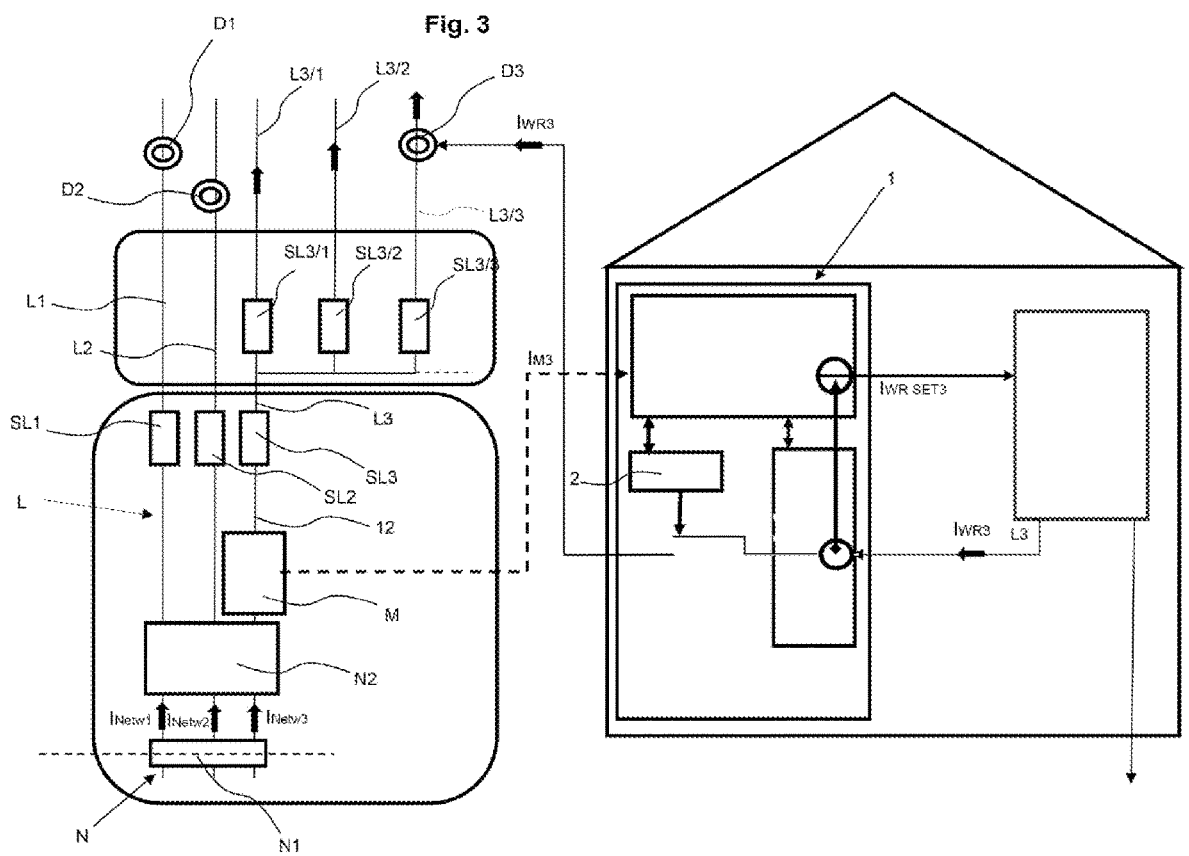
FIG. 3 shows a schematic circuit diagram of a building network with sub-distribution, a single-phase infeeding infeed device and a control device controlling the infeed device according to a third exemplary embodiment.
Figure 4:
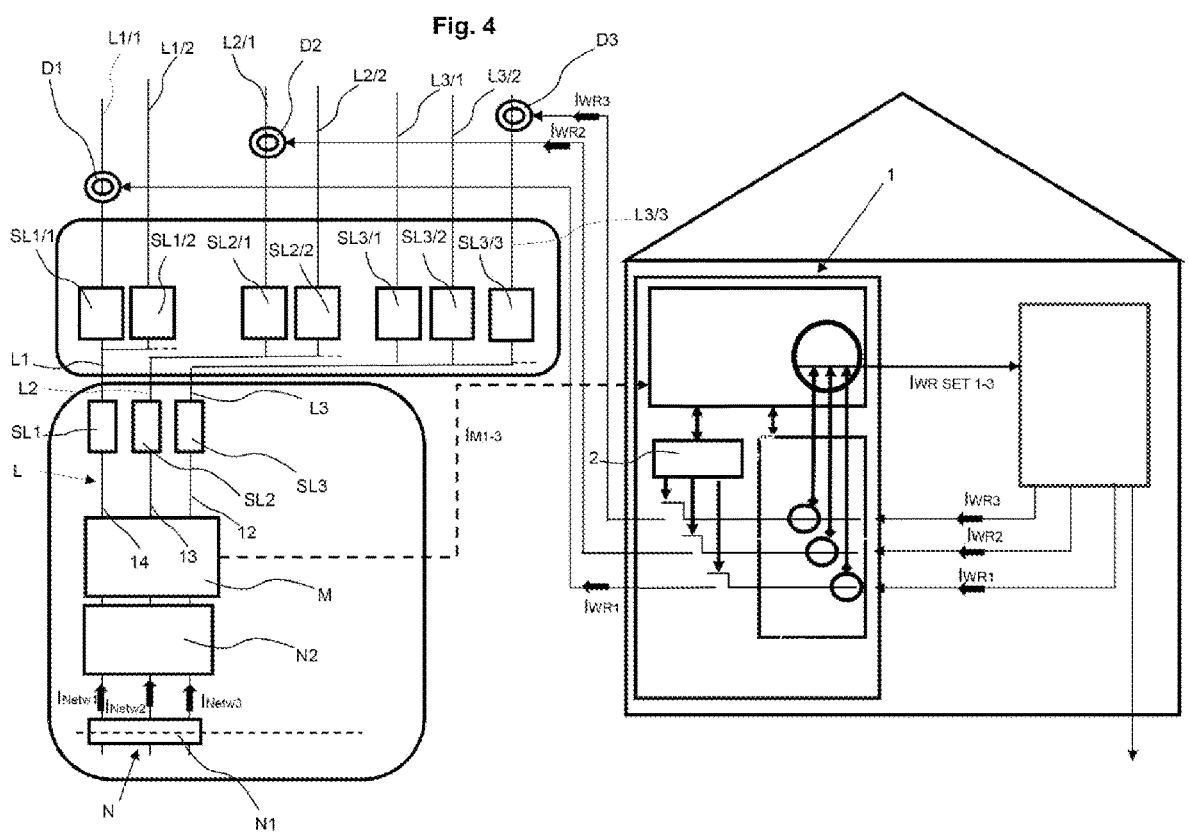
FIG. 4 shows a schematic circuit diagram of a building network with sub-distribution, a three-phase infeeding infeed device and a control device controlling the infeed device according to a fourth exemplary embodiment.

FIGS. 3 and 4 show a building network with sub-distributions. In the third exemplary embodiment, phase L3 of the building network L has a sub-distribution into sub-lines L3/1, L3/2, L3/3, which are protected via assigned overload protectors SL3/1, SL3/2, SL3/3. In addition, the phase L3 has a collection line 12, which is electrically connected to the sub-lines L3/1, L3/2, L3/3. The overload protector SL3 is assigned to the collection line. Power is fed into phase L3 on the sub-line L3/3.

In the fourth exemplary embodiment, each phase L1, L2, L3 of the three-phase building network L has a sub-distribution. A simultaneous feed into phase L1 on sub-conductor L1/1, into phase L2 on sub-conductor L2/1 and into phase L3 on sub-conductor L3/3 is shown purely as an example. In addition, the phase L2 has a collection line 13, which is electrically connected to the sub-lines L2/1, L2/2. The phase L1 has a collection line 14 which is electrically connected to the sub-lines L1/1, L1/2. The overload protector SL1 is assigned to the collection line 14 of phase L1 and the overload protector SL2 is assigned to the collection line 13 of phase L2.

The electrical consumers 11 are not shown in either embodiment. In both embodiments, the measuring device M is arranged upstream of a branch of the collection line 12 of phase L3 into the sub-lines. In the embodiment shown in FIG. 3, the first measured characteristic value $I_{M3}$ is determined similarly to the manner described in FIG. 1. The first measured characteristic value $I_{M3}$ corresponds to a difference between the loads exist on in phase L3 including its sub-lines L3/1, L3/2, L3/3 and the infeed power, in particular the infeed current, fed into the sub-line L3/3 by the infeed device 10. As already described in FIG. 1, it is alternatively possible for the measuring device M to determine the first measured characteristic value similarly to the embodiment shown in FIG. 2 by netting and/or averaging and/or over a time interval, taking into account the load of the three phases L1, L2, L3. In the embodiments shown in FIG. 4, the determination of the first measured characteristic value can be carried out similarly to the determination of the first measured characteristic value in the embodiment shown in FIG. 2.

In particular, to avoid an overload in the building network L, the setpoint value $I_{WR\ Set1-3}$ is specified by means of the control device 1 in such a way that it corresponds to an overload criterion. The overload criterion specifies that the setpoint value $I_{WR\ Set1-3}$ is set to zero if a total power parameter $I_{G1-3}$ derived from the first measured characteristic value $I_{M1-3}$ and the second measured characteristic value $I_{MWR1-3}$, in particular the control value, reaches or exceeds an upper overload limit value G2. In a range that is smaller than the overload limit value G2, the setpoint value $I_{WR\ Set1-3}$ is limited at the top. The upper limit of the setpoint value can be seen from FIG. 5.

The total power parameter $I_{G1-3}$ characterizes the entire electrical current flowing in a phase L1, L2, L3. For each phase, it is made up of the first measured characteristic value $I_{M1-3}$ assigned to the respective phase and the second measured characteristic value $I_{MWR1-3}$ assigned to the respective phase. In particular, the total power parameter per phase corresponds to the sum of the measured characteristic values assigned to the phase. If permitted, balanced measured characteristic values can also be used to calculate the total power parameter. The total power parameter $I_{G1-3}$ determined in this way also corresponds to load $I_{Load1-3}$ which is present on the respective phase L1, L2 or L3 into which it is fed. The loads present on phases L1, L2, L3 can differ from each other. In this case, zero infeed is implemented by setting the setpoint value $I_{WR\ Set1-3}$ for the infeed power to be fed into the corresponding phase L1, L2, L3 at less than or equal to the total power parameter $I_{G1-3}$. For phases that have several sub-lines, the total power parameter per phase corresponds to the sum of the loads of the electrical consumers present on the sub-lines of the phase.

A safety-compliant implementation of the overload criterion preferably takes into account installation-related safety parameters, which in particular characterize the existing building network L available onsite, including existing overprotection devices SL3, SL2, SL3. Such safety parameters are specified, for example, by the nominal currents of existing fuses or by the current carrying capacity of the relevant line sections or can, in particular, suitably parameterize the age-related quality of the installed lines.

The control system of the infeed power determines in particular how the infeed device 10 is regulated when the total power parameter $I_{G1-3}$ approaches the upper overload limit value G2. This will be explained in more detail below with reference to FIG. 5.

Figure 5:
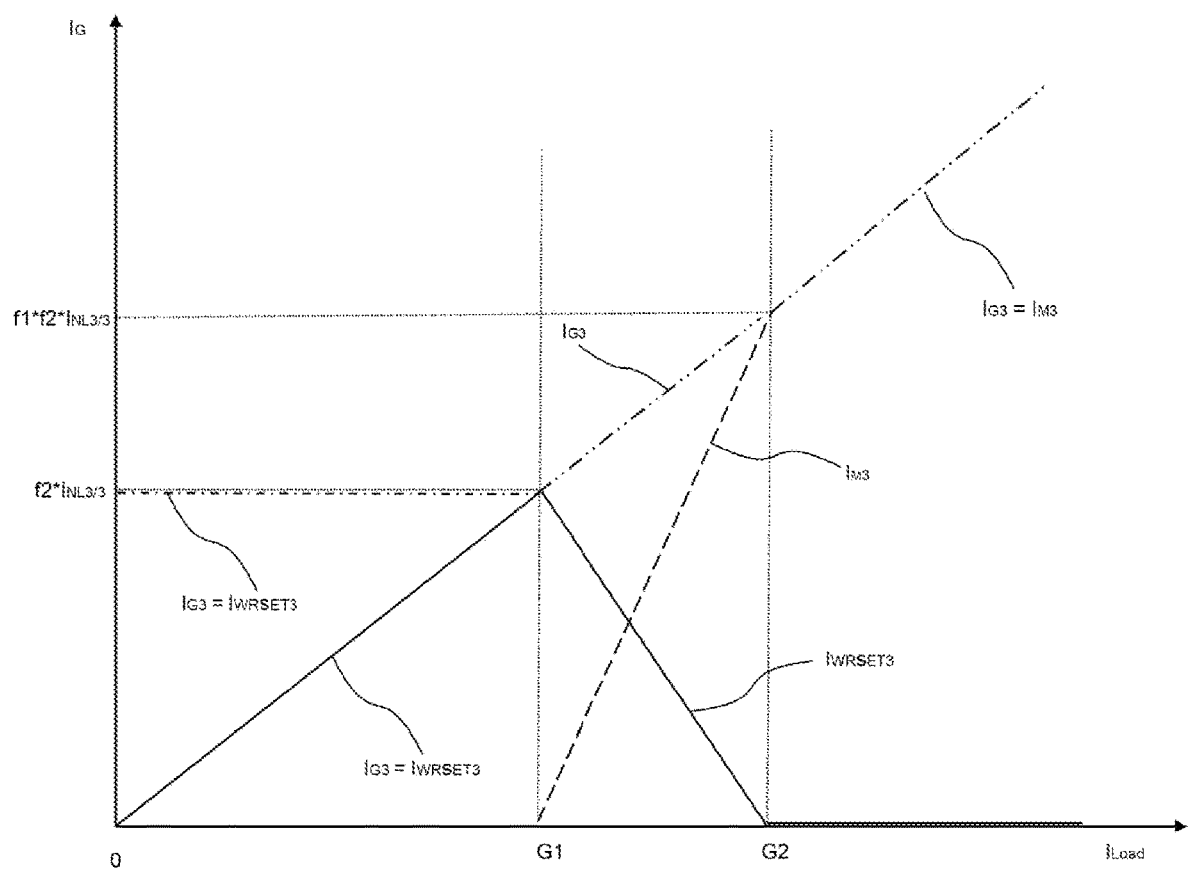
FIG. 5 shows a characteristic curve which characterizes the setpoint value specification for the infeed power to be provided depending on a load.

FIG. 5 shows a characteristic curve which characterizes the setpoint value specification for the infeed power to be provided by the infeed device 10 depending on a load. In particular, the total power parameter $I_G$ is plotted on the vertical axis and the load $I_{Load}$ applied by the electrical consumers is plotted on the horizontal axis.

The setpoint value $I_{WR\ Set3}$ (shown in FIG. 5 with a solid line) initially increases linearly in an operating interval $0 < I_{Load} \leq G1$ up to a maximum value $I_{WR\ Max}$ as a function of the load $I_{Load}$ and then decreases linearly to zero in the adjacent trigger interval $G1 < I_{Load} \leq G2$. This setpoint value curve results when no infeed power can be fed into a supply network or a public grid.

The curve of the setpoint value shown in FIG. 5 represents the upper limit of the setpoint value. This means that during operation, control can take place to a setpoint value that is smaller than the setpoint value shown in FIG. 5. In particular, the level is limited by the zero infeed test during the operating interval $0 < I_{Load} \leq G1$. A higher setpoint value in this area would result in power being output to the external supply network N, which would violate the zero infeed test. The zero infeed test is carried out by the measuring device closest to the building electricity meter N2 of the external supply network N, which is the measuring device M in the exemplary embodiments.

The overload protection prescribed by standard, regulation or law is realized by the overload test. The control unit 1 regulates and monitors the fed-in infeed power, in particular the fed-in infeed current, such that the introduced infeed power, in particular infeed current, does not exceed a maximum permissible value. The maximum permissible value is at the lower overload limit value G1. The lower overload limit value G1 is given by the $G_1 = f_2 I_{nLx/y}$ relationship. The maximum infeed power fed in by the infeed device 10 is at the lower overload limit value G1.

In addition, FIG. 5 shows the setpoint value curve for a case in which it is possible to feed into the supply network or the public grid. The setpoint value curve differs from the previously described setpoint value curve only in the range of $0<I_{Load}\leq G1$. In the other range between G1 and G2, the setpoint value is analogous to the embodiment described above, in which a zero infeed test is carried out. The setpoint value curve in FIG. 5 is in the range $0<I_{Load}\leq G1$ shown as a dash-dotted line. The setpoint value is constant in this range. The level of the setpoint value is limited by the lower overload limit value G1. The lower overload limit G1 is given by the $G_1=f_2 I_{nLx/y}$ relationship. In this embodiment, the maximum infeed power fed in by the infeed device 10 is limited by the lower overload limit value G1. In this embodiment, more infeed power can be fed into the system in the range of $0<I_{Load}\leq G1$ than in an embodiment in which no infeed power is fed into the supply network. This is possible because the additionally supplied infeed power can be fed into the supply network or public grid.

The installation-related safety parameter $I_{nLx/y}$ describes the nominal current or rated current of an overload protector SLx, which is assigned to the phase Lx=L1, L2, L3, if necessary taking into account a sub-distribution y into which the infeed power is fed. The nominal current $I_{nLx/y}$ is specified and can be found in the corresponding fuse data sheets. As a result, the maximum permissible infeed power, in particular infeed current, is limited to the rated current of the fuse. This is based on the fuse that is located in the phase or in the sub-line into which the power is fed.

An installation-related safety parameter is provided by a dimensionless correction factor $f_2$, which describes the quality of the lines of the building network L and in particular assumes a value between 0 and 1. For example, the correction factor $f_2$ for new lines is 1, lines of good quality are described with a correction factor $f_2$ of 0.85 and lines of sufficient quality with a correction factor $f_2$ of 0.65, for example. The correction factor can also be greater than 1, in particular 2, if an electrician determines that a phase, in particular a collection line and/or a sub-line, can withstand a higher current than the nominal current or rated current of the overload protector assigned to the phase.

If the load increases beyond the lower overload limit value G1, the infeed current, i.e. the setpoint value as part of the control, is reduced to zero in a linearly decreasing manner up to the upper limit G2. The upper overload limit G2 is given by the relationship $G_2=f_1 f_2 I_{nLx/y}$. This ensures that the respective overload protector SLx of the phase into which power is fed, if the phase has no sub-line, sees the full load current of the respective line from the moment at which the load current exceeds the upper overload limit value G2. In the case of a phase with at least one sub-line, the respective overload protector SLx/y of the sub-line of the phase being fed into, sees the full load current of the respective line from the moment at which the load current exceeds the upper overload limit value G2. According to the standard mentioned below, this is the case in which the overload protector can, but does not have to, disconnect to protect the phase. This legal/normative requirement is fully guaranteed by the regulation.

The, in particular linear, reduction takes place within the trigger interval, which is limited at the bottom by the lower overload limit value G1 and at the top by the upper overload limit value G2. The lower overload limit value G1 marks the position of the maximum value $I_{WR\ Max}$ and thus determines the maximum infeed power to be provided by the infeed device 10. The width of the trigger interval is specified by the trigger factor $f_1$, which defines the switching characteristics when regulating the infeed device 10.

The trigger factor $f_1$ is, for example, a dimensionless factor greater than 1, e.g. 1.13, in order to determine the desired control behavior and, in particular, to meet national or international safety requirements. According to IEC 60989-1 or DIN EN 60898-1, the trigger factor is a factor that describes when a circuit breaker can, but does not have to, actually trip. This means that, for example, if the factor is f2=1, the control device sets the setpoint value $I_{WRSet}$ to zero from a load current $I_{Load}=f1 \ast I_{nLx/y}$. This ensures that the overload protector always carries the entire load current of the phase in the event of a load $>f1 \ast In$ and can therefore also independently and autonomously ensure the safety of the phase against overload in the event of tripping.

FIG. 5 also shows the curve of the first measured characteristic value $I_{M1-3}$, which in this case corresponds to the current curve, shown in dashed lines, which is drawn from the supply network N at the corresponding load. During the trigger interval, the first measured characteristic value $I_{M1-3}$, in particular the current, increases, meaning that the building network L effectively draws power from the supply network N.

In a possible parameterization, the determination of the setpoint value $I_{WR\ Set}$ at point in time t during an overload test is given by the following relationships:

$$I_{WRSetx} = I_{WRx} + I_{Mx} = I_{Loadx}, \text{ if } 0 \leq I_{Loadx} \leq G_1$$

$$I_{WRSetx} = \frac{f_2 \ast I_{nLx/y}}{f_1 - 1}\left(f_1 - \frac{I_{WRx} + I_{Mx}}{f_2 \ast I_{nLx/y}}\right), \text{ if } G_1 \leq I_{Loadx} \leq G_2$$

$$I_{WRSetx} = 0 \text{ otherwise, so if } I_{Loadx} < 0 \text{ or } I_{Loadx} > G_2$$

In the formulas shown above, the parameter "x" refers to the phase Lx=L1, L2, L3 into which the infeed current is fed. The parameter "y" indicates a sub-distribution of phase Lx into which infeed current is fed.

With regard to the first characteristic value IMX, it should be noted that, as already described above for the individual embodiments, the measuring device can supply a first measured characteristic value assigned to each phase L1, L2, L3. In this case, the parameter "x" in $I_{MX}$ corresponds to the first measured characteristic value assigned to phase L1, L2, L3. Alternatively, the first characteristic value can be determined by averaging and/or balancing, as already described above for FIG. 2.

In the first exemplary embodiment in FIG. 1, $I_{nLx/y}$ corresponds to the nominal current of the overload protector SL3. In the second exemplary embodiment of FIG. 2, power is fed into phase L1, L2 and L3 in accordance with the method already described, whereby the nominal currents of overload protectors SL1, SL2 and SL3 are taken into account accordingly.

The embodiment illustrated in FIG. 3 essentially corresponds to the embodiment of FIG. 1 with the difference that phase L3 is fed into a sub-line L3/3. In this case, the installation-related safety parameter $I_{nLx/y}$ is assigned to an overload protector SL3/3 of the sub-line L3/3.

In the fourth exemplary embodiment, power is fed into the sub-line L1/1 of phase L1, into the sub-line of phase L2/1 of phase L2 and into the sub-line L3/3 of phase L3, so that the nominal current of the overload protector SL1/1, SL2/1 or SL3/3 is taken into account in each case. It is understood that the phase L1, L2, L3 into which the power is fed is arbitrary and can have any sub-distribution.

FIG. 5 shows the curve of the total power parameter, i.e. the electrical current flowing in a phase L1, L2, L3, over a load present on the phase L1, L2, L3. FIG. 5 refers to the embodiment shown in FIG. 3, in which the power is fed into the sub-line L3/3 of phase L3. In this respect, the parameters "x" and "y" in the figure each have the value 3.

Figure 6:
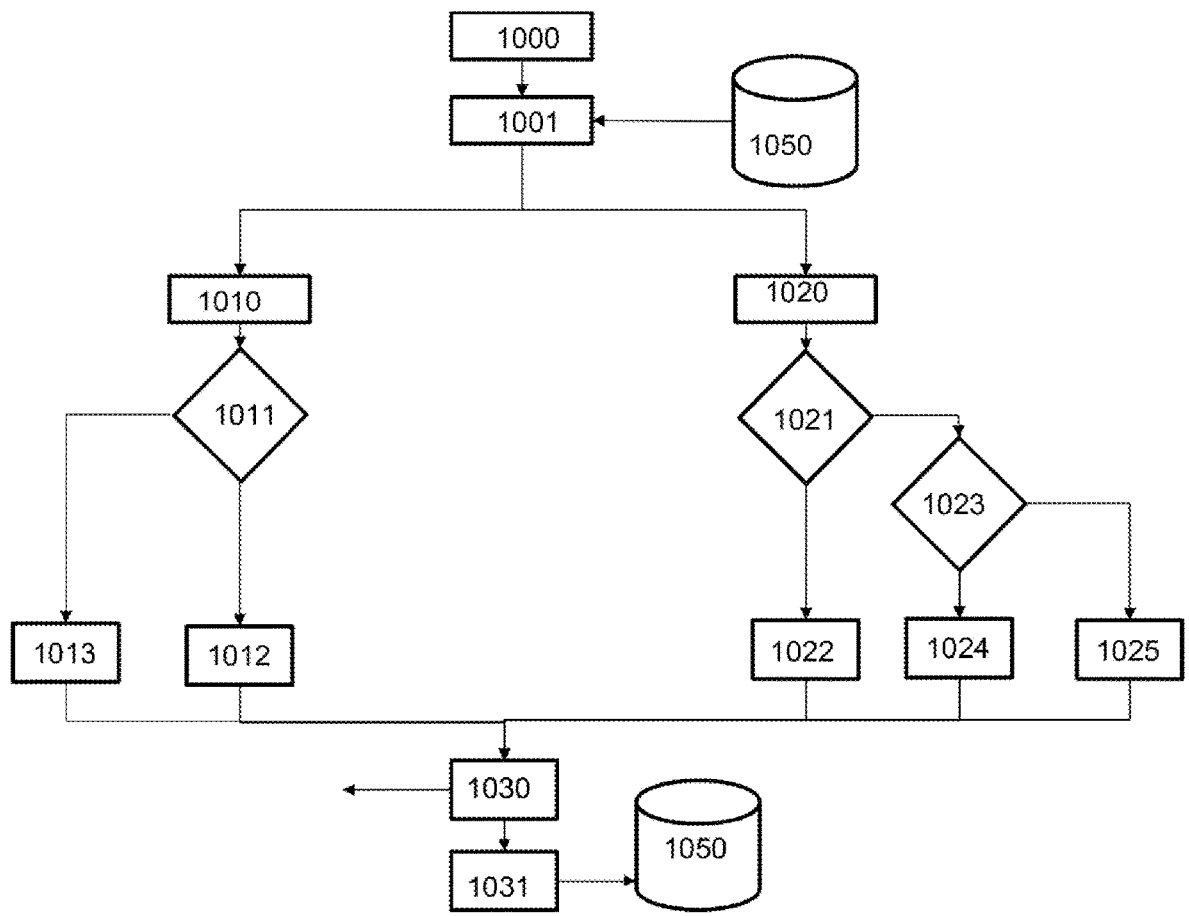
FIG. 6 shows a block diagram of the method for regulating an infeed power of an infeed device, in particular with parallel zero infeed test and setpoint value specification.

FIG. 6 illustrates a block diagram of the method for controlling the infeed power of the infeed device 10 and in particular the zero infeed test with parallel setpoint value specification.

After initialization 1000, a time-synchronous interrogation 1001 of the measurement signals takes place, which characterize the first measured characteristic value $I_{Mx}$ and the second measured characteristic value $I_{WRx}$, in particular control value, and are stored in a memory 1050. In the case of an asynchronous query, measurement signals assigned or corresponding to the same time interval, which characterize the first measured characteristic value $I_{Mx}$ and the second measured characteristic value $I_{WRx}$, in particular control value, are recorded. Subsequently, in an embodiment in which no power can be output to the supply network or public grid, a zero infeed test 1010 and an overload test 1020 are carried out in parallel. This case is shown in FIG. 6. On the other hand, only an overload test 1020 is carried out for an embodiment in which power can be output into the supply network.

The zero infeed test 1010 tests whether the building network L or the phase or phases L1, L2, L3 into which the power is to be fed is drawing power from the supply network N at point in time t. This is done by querying the zero infeed condition 1011, which is given in particular by the condition $0 \leq I_{Mx}$. If this is fulfilled, a first numerical value for the setpoint value $I_{WR\ Set}$ is determined in step 1012 in accordance with $I_{WRSetx} = I_{WRx} + I_{Mx} = I_{Loadx}$ and a release for the feed is issued. In the embodiment shown in FIG. 1, the load $I_{Loadx}$ corresponds to the load present on phase Lx. In the embodiment shown in FIG. 2, the load $I_{Loadx}$ can be determined by averaging and/or balancing the loads present on phases L1, L2, L3. In this case, the infeed power is increased as part of the regulation such that less power is drawn from the external grid N.

Otherwise, i.e. if the zero infeed condition 1011 is not fulfilled, i.e. if a current is actually flowing in the direction of grid N, a second numerical value for the setpoint value $I_{WR\ Setx}$ is determined in step 1013 in accordance with $I_{WRSetx} = I_{WRx} + I_{Mx} = I_{Loadx}$. In this case, the infeed power is reduced such that no power is output into the external supply network N.

In the overload test 1020, the first overload condition 1021 tests whether $I_{Loadx} = I_{WRx} + I_{Mx}$ applies to the load value: $0 \leq I_{Loadx} \leq G1$. If this is fulfilled, a third numerical value for the setpoint value $I_{WR\ Setx}$ is determined in step 1022 in accordance with $I_{WRSetx} = I_{WRx} + I_{Mx} = I_{Loadx}$, otherwise a second overload condition 1023 is tested.

The second overload condition 1023 is $G1 < I_{Loadx} \leq G2$. If the test is positive, in step 1024 a fourth numerical value for the setpoint value $I_{WR\ Set}$ is determined in a possible parameterization as $$I_{WRSetx} = \frac{f_2 * I_{nLx/y}}{f_1 - 1}\left(f_1 - \frac{I_{WRx} + I_{Mx}}{f_2 * I_{nLx/y}}\right).$$

Otherwise, i.e. if both the first and second overload conditions 1021, 1023 are not fulfilled, a fifth numerical value for the setpoint value $I_{WR\ Setx}$ is determined to be zero in step 1025. The overload test is carried out for the phase (FIG. 1, 2) or the sub-distribution (FIG. 3) into which the power is fed.

The determination of the numerical values for the setpoint values $I_{WR\ Setx}$ in steps 1013, 1012, 1022, 1024, 1025 can take place in parallel or time-synchronized. In the evaluation step 1030, the smallest of the numerical values determined in steps 1013, 1012, 1022, 1024, 1025 for the setpoint values $I_{WR\ Set}$ is selected and transmitted as the setpoint value $I_{WR\ Set}$ to the infeed device 10 so as to provide a corresponding infeed power. In the case shown in FIG. 6, power is fed in if the zero infeed test 1010 is positive. In the case (not shown) where no zero infeed test is carried out, a positive overload test results in an infeed.

In step 1031, the measured values and the control data, in particular $I_{WR\ Setx}$, $I_{WRx}$ and $I_{Mx}$ and/or $I_{Loadx}$ are stored in a memory 1050 of the control unit 1. The above method is carried out for each phase L1, L2, L3 into which power is fed.

Although only the zero infeed test and the overload test are shown in FIG. 6, further tests can be carried out to determine the setpoint value. It is therefore conceivable that tests could be based on predefined criteria. This test is carried out in parallel or time-synchronously with the two tests mentioned above. In addition, the result of a further overload test can be taken into account when determining the setpoint value. The further overload test is described in more detail in FIGS. 7-9. In step 1030, only the smallest setpoint value is selected, even taking into account the further overload test and/or further tests. Alternatively, you can use a permissible setpoint value. This is particularly relevant if country-specific conditions need to be taken into account and/or infeed power into the supply network is possible.

Figure 7:
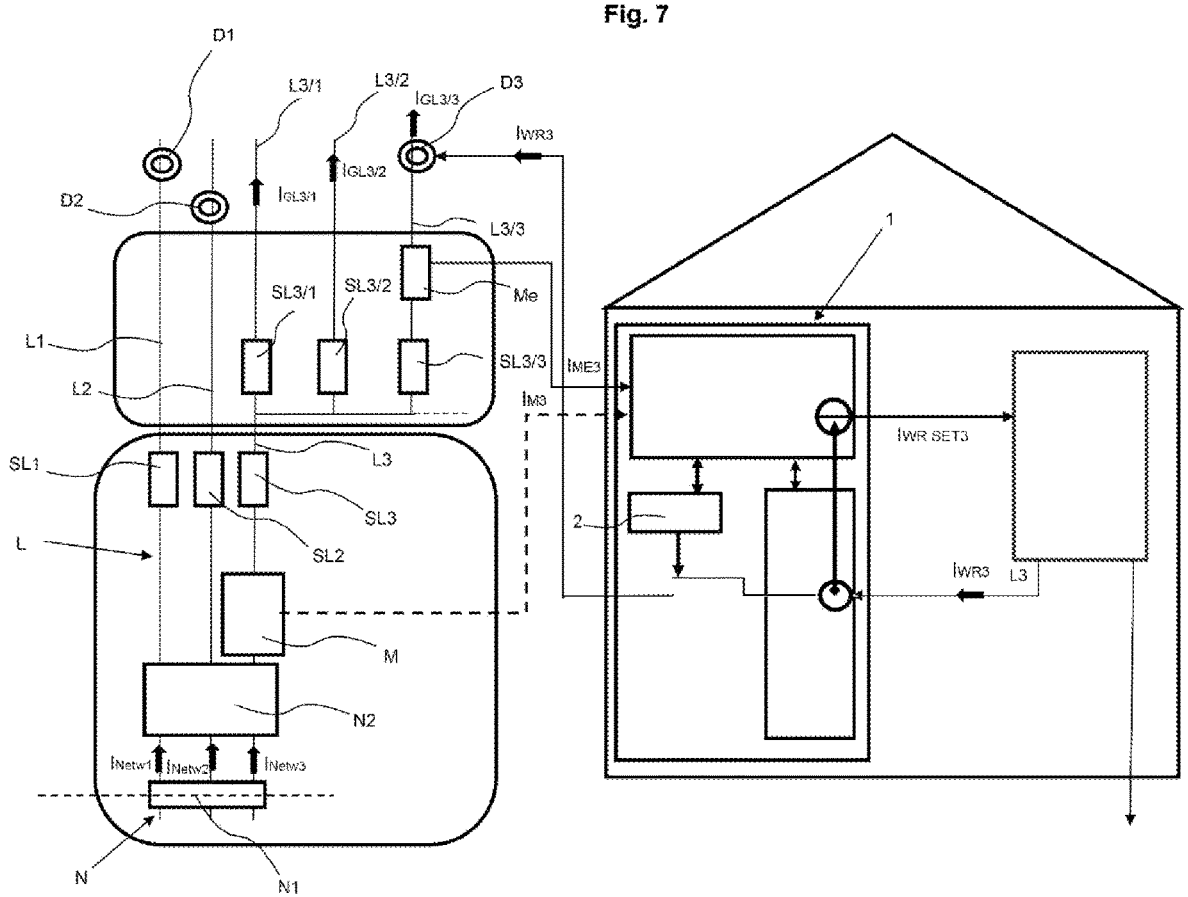
FIG. 7 shows a schematic circuit diagram of a building network with sub-distribution, a single-phase infeeding infeed device and a control device controlling the infeed device according to a fifth exemplary embodiment.

FIG. 7 shows a schematic circuit diagram of a building network L with sub-distribution, a single-phase infeeding infeed device 10 and a control device controlling the infeed device 10 according to a fifth exemplary embodiment. The fifth exemplary embodiment differs from the third embodiment shown in FIG. 3 in that a further measuring device $M_E$ is included.

The further measuring device $M_E$ is arranged downstream of the overload protector SL3/3 in the sub-line L3/3. The further measuring device $M_E$ records a third measured characteristic value $I_{ME3}$ and transmits it to the control device 1. Similar to the embodiment described in FIG. 3, an overload test and a zero infeed test are carried out for the collection line 12 of phase L3. Further information on overload testing can be found in FIGS. 5 and 6 and the associated description.

For the sake of completeness, it should be noted that, similar to the embodiment described above, this embodiment does not require a zero infeed test either. This is the case when infeed power can be fed into the supply network or the public grid. In this case, two overload tests are carried out in this embodiment, as explained in more detail below.

In contrast to the embodiment shown in FIG. 3, a further overload test is also carried out in the embodiment shown in FIG. 7. The difference is that the further overload test is carried out for the sub-line L3/3 of phase L3, into which power is being fed. The zero infeed test for the sub-line L3/3 is not necessary because a current flow into the further sub-lines of phase L3 is desired.

In a possible parameterization, the determination of the setpoint value $I_{WR\ Setx}$ at point in time t is given by the following relationships:

$$I_{WRSetx} = I_{WRx} + I_{MEx} \quad \text{if } 0 \leq I_{WRx} + I_{MEx} \leq G_1$$

$$I_{WRSetx} = f_2 * I_{nLx/y} \quad \text{if } G_1 \leq I_{WRx} + I_{MEx} \leq G_{1a}$$

$$I_{WRSetx} = \frac{f_2 * I_{nLx/y}}{f_1 - 1}\left(f_1 - \frac{I_{WRx} + I_{MEx}}{f_2 * I_{nLx/y}}\right), \quad \text{if } G_{1a} \leq I_{WRx} + I_{MEx} \leq G_2$$

$$I_{WRSetx} = 0 \text{ otherwise, so if } I_{WRx} + I_{MEx} < 0 \text{ or } I_{WRx} + I_{MEx} > G_2$$

For the meaning of the parameters "x" and "y" and the calculation of the first measured characteristic value $I_{Mx}$, reference is made to the explanations above.

In an embodiment in which infeed power is fed into the supply network in the range of $0 \leq I_{WRx} + I_{MEx} \leq G_1$, $I_{MEx}$ is 0. In this case the setpoint value corresponds to $I_{WRSetx} = f_2 * I_{nLx/y}$.

In this parameterization, the lower overload limit value G1 is given by the relationship $G_1 = f_2 I_{nLx/y}$ and the upper overload limit value G2 is given by the relationship $G_2 = f_1 f_2 I_{nLx}$. The lower limit value therefore depends on the nominal current or rated current of the overload protection SLx/y, which is assigned to the sub-line Lx/y into which the power is fed. In contrast, the upper overload limit value depends on the nominal current or rated current of the overload protector SLx, which is assigned to the collection line of phase Lx into which the power is fed.

The other lower overload limit value G1a is given by the relationship $G_{1a} = f_2 I_{nLx}$. The other lower limit value G1a therefore depends on the nominal current or rated current of the overload protector SLx, which is assigned to the collection line of phase Lx into which the power is fed.

Reference is made to the explanations above in respect of the trigger interval and the at least one installation-related safety parameter. The setpoint value $I_{WR\ Setx}$ determined in particular in accordance with the overload criterion is transmitted to the infeed device 10 so as to provide a corresponding infeed power.

As the infeed power is fed into phase L3, in particular the sub-lines L3/3, the parameters x and y in the embodiment shown in FIG. 7 each have the value 3. In contrast, in FIG. 8, the power is fed into the phases L1, L2 and L3. Therefore, three calculations are carried out, with the parameters x and y each having the values 1 to 3 depending on the phase for which the calculation is carried out.

The setpoint values determined as part of the calculations are taken into account in the test in step 1030.

In an embodiment that has two measuring devices, two overload tests can be carried out. In particular, an overload test can be carried out for the sub-line into which the power is fed, and an overload test can be carried out for the phase that the sub-line has. In contrast, only one overload test can be carried out in an embodiment with only one measuring device. As described above, the overload test is carried out in the phase into which the power is fed or in a sub-line into which the power is fed.

Figure 8:
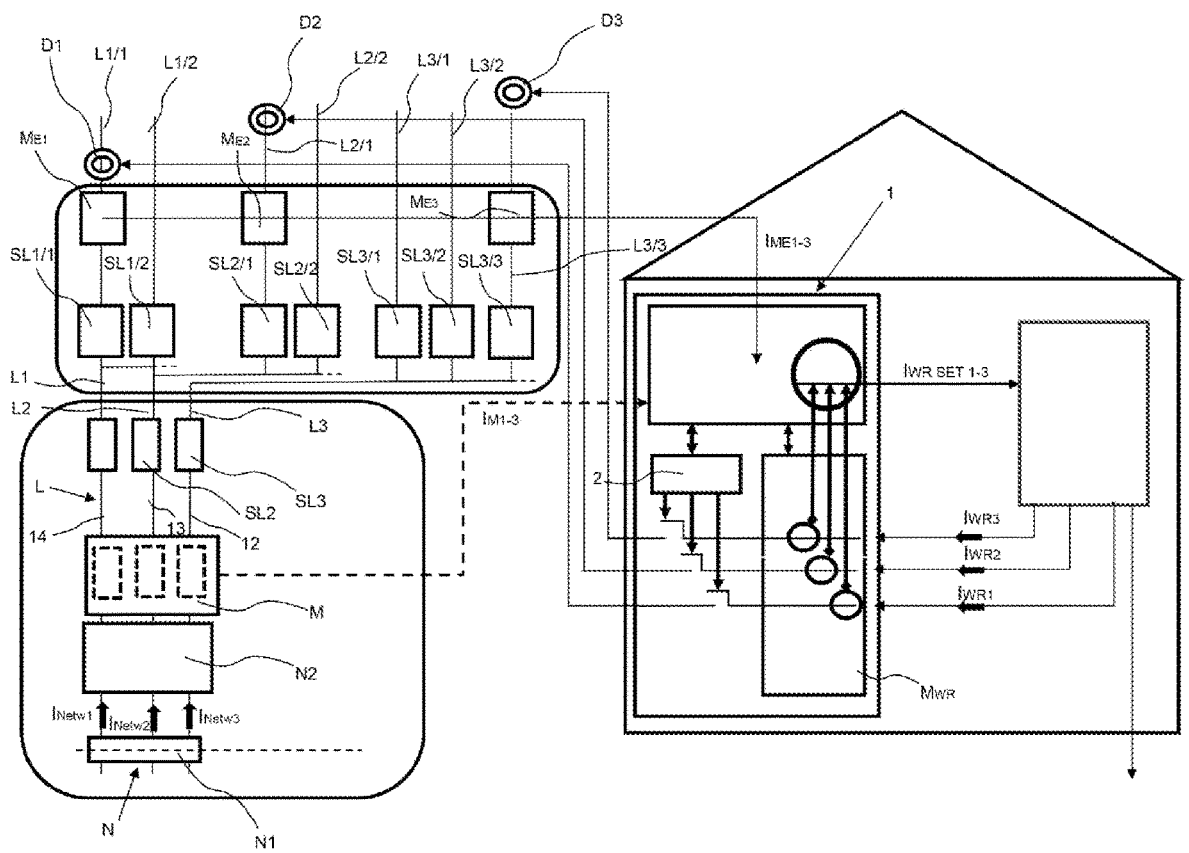
FIG. 8 shows a schematic circuit diagram of a building network with sub-distribution, a three-phase infeeding infeed device and a control device controlling the infeed device according to a sixth exemplary embodiment.

FIG. 8 shows a schematic circuit diagram of a building network with sub-distribution, a three-phase infeeding infeed device and a control unit controlling the infeed device according to a sixth exemplary embodiment. The sixth exemplary embodiment differs from the fourth embodiment shown in FIG. 4 in that several further measuring devices $M_{E1-3}$ are included. In particular, three further measuring devices $M_{E1-3}$ are included. Another difference is that the measuring device M is designed similarly to FIG. 2.

Each of the further measuring devices $M_{E1-3}$ records a third measured characteristic value $I_{ME1-3}$ and transmits it to the control device 1, whereby the recorded third measured characteristic values $I_{ME1-3}$ may differ from one another. The further measuring devices are arranged in different sub-lines of phases L1, L2, L3. In addition, the further measuring devices $M_{E1-3}$ are arranged downstream of the overload protector SL1/1, SL2/1, SL3/1 arranged in the sub-line.

In the control device 1, a further overload test is carried out based on the third measured characteristic values recorded by the other measuring devices $M_{E1-3}$. Each of the further overload tests is carried out similarly to the further overload test described in FIG. 7. An overload test and a further overload test are carried out for each phase L1, L2, L3 similarly to the manner described in FIG. 7 and a setpoint value $I_{WRSet1-3}$ is defined for each phase L1, L2, L3.

Figure 9:
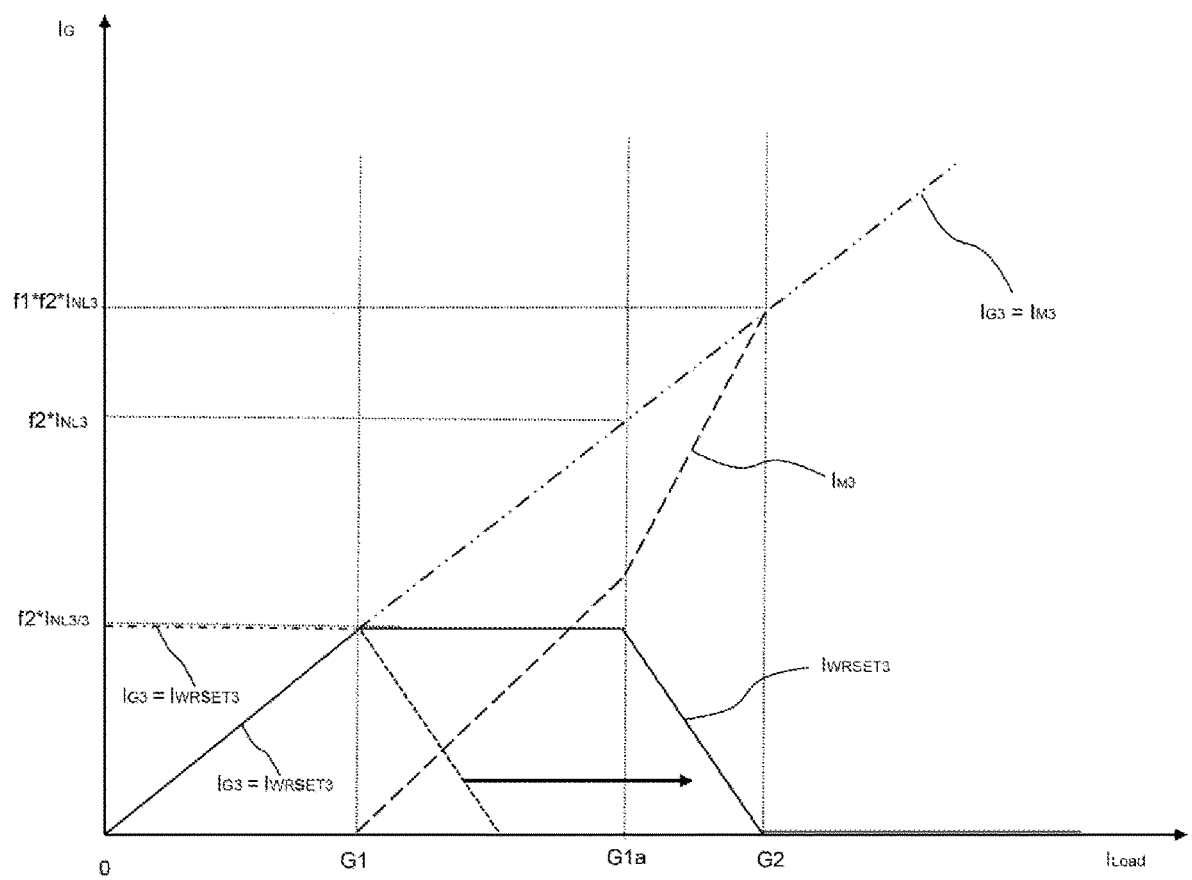
FIG. 9 shows a characteristic curve which characterizes the setpoint value specification for the infeed power to be provided depending on a load.

FIG. 9 shows a characteristic curve which characterizes the setpoint value specification for the infeed power to be provided depending on a load $I_{Load}$ of an electrical consumer. FIG. 9 shows the characteristic curve for embodiments that contain the further measuring device $M_{E1-3}$, i.e. for the embodiments shown in FIGS. 7 and 8. FIG. 9 shows the characteristic curve for the embodiment shown in FIG. 7, in which power is fed into phase L3. The control system is designed in such a way that the characteristic curve is essentially the same when the power is fed into a different phase, as is the case, for example, with the embodiment shown in FIG. 8.

FIG. 9 also shows the characteristic curve for the setpoint value, which decreases from the lower overload limit value G1 and is shown as a dashed line in FIG. 5. FIG. 9 shows that the characteristic curve for the setpoint value has been shifted, which is advantageous in that the infeed power can also be fed in at higher load values. The shift in the declining characteristic curve is symbolized by the arrow and is a result of the other measuring device $M_E$ being provided.

The setpoint value $I_{WRSET3}$ is limited in operation up to the lower overload limit value G1 exclusively by the limitation through zero infeed into the external supply network. The maximum permissible infeed power is reached at the overload limit value G1. This results from the overload test for sub-line L3/3. The infeed current fed into the sub-line L3/3 can flow into the other sub-lines L3/1, L3/2, which is shown by the displacement of the falling edge with respect to the embodiment shown in FIG. 5.

The level of the setpoint value is limited by the overload test for the sub-line L3/3, such that the setpoint value is constant between the lower overload limit value G1 and the other lower overload limit value G1a. The shift ends as soon as the overload limit of the total current for the collection line 12 of phase L3 is reached. This is the case with the other lower overload limit value G1a. As loads continue to increase, the setpoint value falls to zero at the upper overload limit value G2 due to the overload test with respect to the collection line 12 of phase L3. From the upper overload limit value G2, the overload protector SL3 assigned to phase L3 can then disconnect.

In addition, FIG. 9 shows the setpoint value curve for a case in which it is possible to feed into the supply network or the public grid. The setpoint value curve differs from the previously described setpoint value curve only in the range of $0 < I_{Load} \leq G1$. In the other range between G1 and G2, the setpoint value is analogous to the embodiment described above, in which a zero infeed test is carried out. The setpoint value curve in FIG. 9 is in the range $0 < I_{Load} \leq G1$ shown as a dash-dotted line. The setpoint value is constant in this range. The level of the setpoint value is limited by the lower overload limit value G1. The lower overload limit G1 is given by the $G_1 = f_2 I_{nLx/y}$ relationship. In this embodiment, the maximum infeed power fed in by the infeed device 10 is limited by the lower overload limit value G1.

REFERENCE SYMBOLS

1 Control device
2 Safety device
3 Input interface
5 Evaluation unit
7 Output interface
8 Isolating device
10 Infeed device
11 Electrical consumer
12 Phase L3 collection line
13 Phase L2 collection line
14 Phase L1 collection line
M Measuring device
$M_{WR}$ Other measuring device
$M_E$ Further measuring device
N (external) supply network
N1 Mains transfer point
N2 Metering unit
L Consumer network
L1 Phase
L2 Phase
L3 Phase
D1 Electrical connection (Phase L1)
D2 Electrical connection (Phase L2)
D3 Electrical connection (Phase L3)
SL1 Overload protector (Phase L1 collection line 14)
SL2 Overload protector (Phase L2 collection line 13)
SL3 Overload protector (Phase L3 collection line 12)
L1/1 Sub-line (Phase L1)
L1/2 Sub-line (Phase L1)
L1/3 Sub-line (Phase L1)
SL1/1 Overload protector (sub-line L1/1)
SL1/2 Overload protector (sub-line L1/2)
SL1/3 Overload protector (sub-line L1/3)
L2/1 Sub-line (Phase L2)
L2/2 Sub-line (Phase L2)
L2/3 Sub-line (Phase L2)
SL2/1 Overload protector (sub-line L2/1)
SL2/2 Overload protector (sub-line L2/2)
SL2/3 Overload protector (sub-line L2/3)
L3/1 Sub-line (Phase L3)
L3/2 Sub-line (Phase L3)
L3/3 Sub-line (Phase L3)
SL3/1 Overload protector (sub-line L3/1)
SL3/2 Overload protector (sub-line L3/2)
SL3/3 Overload protector (sub-line L3/2)
$I_{G1-3}$ Total power parameter (Phases 1 to 3)
$I_{M1-3}$ First measured characteristic value (Phases 1 to 3)
$I_{MWR1-3}$ Second measured characteristic value (Phases 1 to 3)
$I_{ME1-3}$ Third measured characteristic value (Phases 1 to 3)
$I_{WR\ Set1-3}$ Setpoint value (Phases 1 to 3)
$I_{Load1-3}$ Load (Phases 1 to 3)
$I_{WR1-3}$ Infeed current (Phases 1 to 3)
$I_{Load}$ Load of the electrical consumer
G1 Lower overload limit value
G1a Other lower overload limit value
G2 Upper overload limit value
1000 Initialization
1001 Measuring signal query
1010 Zero infeed test
1011 Zero infeed condition
1012 Step
1013 Step
1020 Overload test
1021 First overload condition
1022 Step
1023 Second overload condition
1024 Step
1025 Step
1030 Evaluation step
1050 Memory

The invention claimed is:

1. A method for regulating an infeed power of an infeed device into at least one phase of an electrical consumer network comprising at least one electrical consumer, comprising:
   a. detecting a first measured characteristic value that characterizes a power consumed or output by the at least one phase of the electrical consumer network at a point in time;
   b. detecting a second measured characteristic value that characterizes an infeed power fed into the at least one phase by the infeed device at the point in time, as a control value;
   c. determining a setpoint value from the first measured characteristic value and the control value, wherein an overload test is carried out, in which the setpoint value from the first measured characteristic value and the control value is determined in such a way that the setpoint value is set to zero if a total power parameter derived from the first measured characteristic value and the control value reaches or exceeds an upper overload limit value;
   d. determining a third measured characteristic value, which depends on an infeed power fed into a sub-line of a phase of the consumer network and a load of at least one electrical consumer present on the sub-line of the phase into which the infeed power is fed, wherein at least one further overload test is carried out, in which the setpoint value from the third measured characteristic value and the control value is determined in such a way that the setpoint value is set to zero if a total power parameter derived from the third measured characteristic value and the control value reaches or exceeds an upper overload limit value;
   e. regulating the infeed device in accordance with the setpoint value so as to provide an infeed power corresponding to the setpoint value; and
   f. feeding the infeed power into an electrical connection of the consumer network that is electrically connected to at least one phase and is configured for AC voltages between 100 and 500 V.

2. The method according to claim 1, wherein:
   a. the first measured characteristic value characterizes a power consumed or output by a single phase of the electrical consumer network; and/or
   b. the first measured characteristic value characterizes a power consumed or output by a plurality of phases of the electrical consumer network; and/or
   c. the first measured characteristic value corresponds to a difference between the load of the at least one electrical consumer, which exists on the at least one phase, into which the infeed power is fed, and the infeed power fed into the at least one phase.

3. The method according to claim 1, wherein a condition of the setpoint value is determined in such a way that a characteristic curve describing the setpoint value as a function of the total power parameter in a trigger interval, which is limited downwards by a lower overload limit value and upwards by the upper overload limit value, decreases to zero.

4. The method according to claim 3, wherein:
a. a width of the trigger interval is specified depending on a trigger factor defining a switching characteristic; and/or
b. during the trigger interval, power is consumed by the at least one phase of the electrical consumer network, in particular power from the supply network electrically connected to the electrical consumer network.

5. The method according to claim 3, wherein:
a. the characteristic curve describing the setpoint value as a function of the total power parameter has an at least partially linear curve in an operating interval, which is limited at the top by the lower overload limit value; and/or
b. the setpoint value in an operating interval, which is limited at the top by the lower overload limit value, corresponds to a load of the at least one electrical consumer or is less than a load of the at least one electrical consumer; and/or
c. the total power parameter corresponds to a sum of the control value and the first measured characteristic value; and/or
d. the control is carried out in such a way that the total power parameter corresponds to the load value of the at least one electrical consumer.

6. The method according to claim 3, wherein the upper and/or the lower overload limit value is specified depending on at least one installation-related safety parameter and/or depending on a trigger factor defining a switching characteristic.

7. The method according to claim 6, wherein the installation-related safety parameter is determined:
a. as a function of an overload protector assigned to at least one phase; and/or
b. depending on a current carrying capacity of at least one sub-line of the phase of the electrical consumer network; and/or
c. depending on a nominal current of an overload protector.

8. The method according to claim 1, wherein a zero infeed test is carried out, in which:
a. the setpoint value is determined in such a way that the setpoint value is less than or equal to a load of the at least one electrical consumer, which exists on the at least one phase; and/or
b. the setpoint value is determined in such a way that the setpoint value is less than or equal to a load of the at least one electrical consumer, wherein the load corresponds to an average value of the load being present on the individual phases; and/or
c. based on the first measured characteristic value, it is tested whether power is output from the at least one phase of the electrical consumer network to a network electrically connected to the electrical consumer network at the point in time.

9. The method according to claim 8, wherein the infeed power provided in accordance with the setpoint value is fed into the at least one phase of the consumer network, when it is determined that power is consumed by the consumer network at the point in time.

10. The method according to claim 1, wherein:
a third measured characteristic value is determined, corresponding to a difference between the load of at least one electrical consumer present on the sub-line of the phase into which the infeed power is fed and the infeed power fed into a sub-line of a phase of the consumer network.

11. The method according to claim 10, wherein:
a. a condition of the setpoint value is determined in such a way that a characteristic curve describing the setpoint value as a function of the total power parameter in a trigger interval, which is limited downwards by a further lower overload limit value and upwards by the upper overload limit value, decreases to zero; and/or
b. the setpoint value is constant in an interval that is limited downwards by a lower overload limit value and upwards by the other lower overload limit value, wherein the lower overload limit value relates to the sub-line of the phase into which the infeed power is fed, and the other lower overload limit relates to a collection line of the phase into which the infeed power is fed; and/or
c. the determination of the setpoint value occurs such that the characteristic curve describing the setpoint value as a function of the total power parameter has an at least partially linear curve in an operating interval, which is limited at the top by the lower overload limit value.

12. The method according to claim 1, wherein a criterion test is carried out, in which the setpoint value is additionally determined taking into account at least one predeterminable criterion.

13. The method according to claim 1, wherein at least two tests for determining the setpoint value are carried out in parallel or time-synchronously.

14. The method according to claim 13, wherein the setpoint value determined during the tests, which has the smaller numerical value, is used for regulating the infeed device.

15. The method according to claim 1, wherein an isolation test is carried out, and wherein the infeed device is isolated from the consumer network if an isolation criterion exists.

16. A control device for carrying out the method according to claim 1, comprising:
at least one input interface configured to receive a first measured characteristic value that characterizes a power consumed or output by the at least one phase of the electrical consumer network at a point in time, and for receiving a second measured characteristic value that characterizes an infeed power fed into the at least one phase by the infeed device at the point in time, as the control value;
an evaluation unit configured to determine a setpoint value from the measured characteristic value and the control value;
an output interface configured to output an output signal for regulating the infeed device in accordance with the setpoint value; and
an electrical control device connection configured to feed the infeed power provided by the infeed device into the at least one phase, in particular into an electrical connection electrically connected to the phase of the consumer network, wherein the control device connection is configured for AC voltages between 100 and 500 V.

17. The control device according to claim 16, further comprising:

a. at least one measuring device, which is configured to detect measuring signals characterizing at least the first measured characteristic value and to transmit them to at least one input interface; and/or
b. at least one other measuring device, which is configured to detect measuring signals characterizing at least the second measured characteristic value and to transmit them to at least one input interface; and/or
c. at least one further measuring device, which is configured to detect measuring signals characterizing at least the third measured characteristic value and to transmit them to at least one input interface.

18. The control device according to claim 17, wherein data transmission occurs via a fail-safe data exchange protocol.

19. The control device according to claim 16, wherein the control device has an isolating device for isolating the infeed device from the consumer network.

* * * * *